(12) United States Patent
Liu et al.

(10) Patent No.: US 12,449,389 B2
(45) Date of Patent: Oct. 21, 2025

(54) HUMIDITY SENSOR, MANUFACTURING METHOD THEREFOR AND ELECTRONIC DEVICE

(71) Applicant: BOE Technology Group Co., Ltd., Beijing (CN)

(72) Inventors: Jianxing Liu, Beijing (CN); Jingwen Guo, Beijing (CN); Qianhong Wu, Beijing (CN); Chunxin Li, Beijing (CN); Jianyun Zhao, Beijing (CN); Zibo Cao, Beijing (CN); Feng Qu, Beijing (CN); Biqi Li, Beijing (CN)

(73) Assignee: Beijing BOE Technology Development Co., Ltd., Beijing (CN)

( * ) Notice: Subject to any disclaimer, the term of this patent is extended or adjusted under 35 U.S.C. 154(b) by 0 days.

(21) Appl. No.: 18/557,964

(22) PCT Filed: Feb. 23, 2023

(86) PCT No.: PCT/CN2023/077898
§ 371 (c)(1),
(2) Date: Oct. 30, 2023

(87) PCT Pub. No.: WO2024/174166
PCT Pub. Date: Aug. 29, 2024

(65) Prior Publication Data
US 2025/0076241 A1    Mar. 6, 2025

(51) Int. Cl.
*G01N 27/22* (2006.01)
*B81B 3/00* (2006.01)

(52) U.S. Cl.
CPC ........... *G01N 27/223* (2013.01); *B81B 3/001* (2013.01); *B81B 2201/0214* (2013.01); *B81B 2203/0118* (2013.01); *B81B 2203/04* (2013.01)

(58) Field of Classification Search
CPC ...... G01N 27/223; G01N 27/22; B81B 3/001; B81B 2201/0214; B81B 2203/0118; B81B 2203/04
See application file for complete search history.

(56) References Cited

U.S. PATENT DOCUMENTS

2001/0048507 A1* 12/2001 Thomas ................. G02B 30/27
348/E13.043
2005/0189958 A1    9/2005 Chen et al.
(Continued)

FOREIGN PATENT DOCUMENTS

CN    102565149 A    7/2012
CN    202433336 U    9/2012
(Continued)

*Primary Examiner* — Alvaro E Fortich
(74) *Attorney, Agent, or Firm* — Ling Wu; Stephen Yang; Ling and Yang Intellectual Property

(57) ABSTRACT

A humidity sensor, a manufacturing method therefor and an electronic device are provided, and the humidity sensor includes: a base substrate, and at least one sensor unit arranged on the base substrate; the sensor unit includes: a first electrode and a support structure arranged on the base substrate, the support structure is located on at least one side of the first electrode; a second electrode located on a side of the first electrode away from the base substrate, an orthographic projection of the second electrode on the base substrate is overlapped with an orthographic projection of the first electrode on the base substrate, a space is arranged between the second electrode and the first electrode, and at least one end of the second electrode is fixed with the support structure; and an adsorption layer arranged on a side of the second electrode away from the base substrate.

20 Claims, 11 Drawing Sheets

(56) References Cited

U.S. PATENT DOCUMENTS

| | | | |
|---|---|---|---|
| 2007/0024549 A1 | 2/2007 | Choi et al. | |
| 2007/0201710 A1 | 8/2007 | Suzuki et al. | |
| 2015/0185176 A1* | 7/2015 | Koo | G01N 27/223 427/79 |
| 2016/0246081 A1* | 8/2016 | Jing | H10N 30/101 |
| 2016/0363789 A1* | 12/2016 | Jing | B30B 15/067 |
| 2019/0227019 A1 | 7/2019 | Mastrangelo et al. | |
| 2019/0361219 A1* | 11/2019 | Gao | G09G 3/348 |

FOREIGN PATENT DOCUMENTS

| | | |
|---|---|---|
| CN | 103018289 A | 4/2013 |
| CN | 104671186 A | 6/2015 |
| CN | 104990968 A | 10/2015 |
| CN | 104634832 B | 1/2018 |
| CN | 111693581 A | 9/2020 |
| CN | 111721814 A | 9/2020 |
| CN | 114280104 A | 4/2022 |
| JP | H02212745 A | 8/1990 |
| JP | H07307496 A | 11/1995 |
| JP | 2004102150 A | 4/2004 |
| KR | 20050095964 A | 10/2005 |
| KR | 100667291 B1 | 1/2007 |
| KR | 20150014550 A | 2/2015 |

\* cited by examiner

HUMIDITY SENSOR, MANUFACTURING METHOD THEREFOR AND ELECTRONIC DEVICE

CROSS-REFERENCE TO RELATED APPLICATION

The present application is a U.S. National Phase Entry of International Application PCT/CN2023/077898 having an international filing date of Feb. 23, 2023, and entitled "Humidity Sensor, Manufacturing Method Therefor and Electronic Device", the contents of which are hereby incorporated herein by reference in their entireties.

TECHNICAL FIELD

The present disclosure relates to, but is not limited to, the technical field of sensors, in particular to a humidity sensor, a manufacturing method therefor and an electronic device.

BACKGROUND

Humidity sensors are widely used in many fields such as national defense aviation, meteorological detection, industrial control, agricultural production, and medical equipment. In recent years, an important development direction of humidity sensors is miniaturization. The existing micro humidity sensors are mainly capacitive, resistive and piezoresistive. Capacitive humidity sensors have been widely used in commercial fields because of its advantages of low power consumption and low cost.

Detection principles of humidity sensors may be roughly divided into two types: 1. by using characteristics that water molecules are easy to adsorb on a solid surface and permeate into the solid, performance of the solid itself is changed to form different types of humidity sensors. 2. the humidity is measured by using a difference of heat conduction between humid air and dry air; by using a microwave propagating in air containing water vapor, which absorbs the microwave to produce certain energy loss, energy loss during transmission is related to the humidity in ambient air to measure the humidity; the humidity in the air is measured by using water vapor to absorb infrared rays with specific wavelengths.

SUMMARY

The following is a summary of subject matter described herein in detail. This summary is not intended to limit the protection scope of the claims.

In one aspect, the present disclosure provides a humidity sensor, including:
a base substrate;
at least one sensor unit arranged on the base substrate;
each sensor unit includes:
a first electrode and a support structure arranged on the base substrate, wherein the support structure is located on at least one side of the first electrode;
the second electrode located on a side of the first electrode away from the base substrate, wherein an orthographic projection of the second electrode on the base substrate is overlapped with an orthographic projection of the first electrode on the base substrate, and a space is provided between the second electrode and the first electrode; at least one end of the second electrode is fixed to the support structure; and
an adsorption layer arranged on a side of the second electrode away from the base substrate.

In an exemplary embodiment, the support structure includes a first support layer and a second support layer which are stacked, wherein the first support layer is arranged on the base substrate, at least a portion of the second support layer is arranged on a side of the first support layer away from the base substrate, and a fixation groove is formed between the at least a portion of the second support layer and the first support layer; and at least one end of the second electrode is fixed in the fixation groove.

In an exemplary embodiment, the first support layer includes a first support part and a first cantilever part connected with each other, wherein the first support part is arranged on the base substrate and is located on at least one side of the first electrode, and the first cantilever part is intersected with the first support part and is located on a side of the first electrode away from the base substrate; the second support layer includes a second support part and a second cantilever part connected with each other, wherein the second support part is arranged on the base substrate and is located on a side of the first support part away from the first electrode, and the second cantilever part is intersected with the second support part and is arranged on a side of the first cantilever part away from the base substrate; and the fixation groove is formed between the second cantilever part and the first cantilever part.

In an exemplary embodiment, on a cross section perpendicular to a plane where the base substrate is located, the first support layer is in a shape of an inverted L, the first support part extends along a thickness direction of the base substrate, and the first cantilever part extends along a direction parallel to the plane where the base substrate is located.

In an exemplary embodiment, on a cross section perpendicular to a plane where the base substrate is located, the second support layer is in a shape of an inverted L, the second support part extends along a thickness direction of the base substrate, and the second cantilever part extends along a direction parallel to the plane where the base substrate is located.

In an exemplary embodiment, at least a portion of the first support part is in contact with the second support part.

In an exemplary embodiment, a portion of the first cantilever part close to the first support part is in contact with a portion of the second cantilever part close to the second support part, and the fixation groove is formed between a portion of the first cantilever part away from the first support part and a portion of the second cantilever part away from the second support part.

In an exemplary embodiment, an orthographic projection of the fixation groove is overlapped with the orthographic projection of the first electrode on the base substrate.

In an exemplary embodiment, an orthographic projection of the fixation groove on the base substrate is completely overlapped with an orthographic projection of at least one end of the second electrode on the base substrate.

In an exemplary embodiment, the fixation groove is formed between the whole first cantilever part and the whole second cantilever part, and an orthographic projection of the fixation groove on the base substrate coincides with orthographic projections of the first cantilever part and the first support part on the base substrate.

In an exemplary embodiment, an orthographic projection of at least a portion of the fixation groove on the base substrate is overlapped with an orthographic projection of an end of the second electrode on the base substrate, and an orthographic projection of at least a portion of the fixation groove is not overlapped with an orthographic projection of the second electrode on the base substrate.

In an exemplary embodiment, the orthographic projection of the first electrode on the base substrate is within the orthographic projection of the second electrode on the base substrate.

In an exemplary embodiment, each of the first support layer and the second support layer includes a hard metal material.

In an exemplary embodiment, the first support layer and the second support layer are both layered structures, the first support layer is arranged on the base substrate and is arranged on at least one side of the first electrode, the second support layer is arranged on the first support layer, and the fixation groove is formed between an end of the second support layer close to the first electrode and an end of the first support layer close to the first electrode.

In an exemplary embodiment, an orthographic projection of the first support layer on the base substrate is not overlapped with an orthographic projection of the first electrode on the base substrate.

In an exemplary embodiment, an orthographic projection of the second support layer on the base substrate is within an orthographic projection of the first support layer on the base substrate and is not overlapped with the orthographic projection of the first electrode on the base substrate.

In an exemplary embodiment, the first support layer includes an optical adhesive.

In an exemplary embodiment, the second support layer includes an inorganic material.

In an exemplary embodiment, a side surface of the first support layer is in contact with a side surface of the first electrode.

In an exemplary embodiment, the support structure includes a single-layer support layer, a fixation groove is provided with on a side of the support layer close to the second electrode, and at least one end of the second electrode is fixed in the fixation groove.

In an exemplary embodiment, a dielectric layer is further included, which is arranged on the first electrode and at least covers a top surface of the first electrode.

In an exemplary embodiment, a stress layer is further included, at least a portion of the stress layer is arranged between the first electrode and the base substrate.

In an exemplary embodiment, the support structures are located on two opposite sides of the first electrode.

In an exemplary embodiment, the support structure is located on a side of the first electrode.

In an exemplary embodiment, an anti-adhesion post is further included, which is arranged on the base substrate, and the anti-adhesion post and the support structure are located on different sides of the first electrode. An orthographic projection of the anti-adhesion post on the base substrate is overlapped with an orthographic projection of at least a portion of the second electrode on the base substrate, the orthographic projection of the anti-adhesion post on the base substrate is not overlapped with the orthographic projection of the first electrode on the base substrate, and a top surface of the anti-adhesion post is located on a side of the top surface of the first electrode away from the base substrate.

In an exemplary embodiment, an orthographic projection of the adsorption layer on the base substrate is within the orthographic projection of the second electrode on the base substrate.

In an exemplary embodiment, the orthographic projection of the adsorption layer on the base substrate is overlapped with the orthographic projection of the first electrode on the base substrate.

In an exemplary embodiment, a digital controlled circuit is further included, which is connected to at least one sensor unit and is configured to transmit a drive signal to particular one or more sensor units.

In another aspect, the present disclosure further provides an electronic device, including the aforementioned humidity sensor.

In a further aspect, the present disclosure further provides a method for manufacturing a humidity sensor, including:
  forming a first electrode on a base substrate;
  forming a support structure on the base substrate, wherein the support structure is located at least one side of the first electrode;
  forming a second electrode, which is located on a side of the first electrode away from the base substrate, wherein an orthographic projection of the second electrode on the base substrate is overlapped with an orthographic projection of the first electrode on the base substrate, and a space is provided between the second electrode and the first electrode; at least one end of the second electrode is fixed to the support structure; and
  forming an adsorption layer on the second electrode.

Other aspects may become clear after the accompanying drawings and the detailed description are read and understood.

BRIEF DESCRIPTION OF DRAWINGS

Accompanying drawings are used for providing an understanding for technical solutions of the present application and form a part of the specification, are used for explaining the technical solutions of the present application together with embodiments of the present application, and do not constitute a limitation on the technical solutions of the present application.

DETAILED DESCRIPTION

Figure 1:
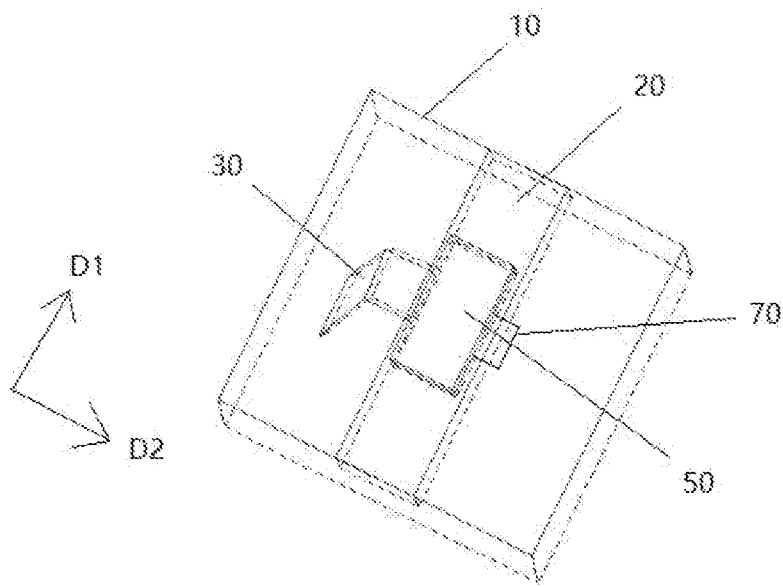
FIG. 1 is a schematic diagram of a structure of a humidity sensor according to an exemplary embodiment.

To make objectives, technical solutions, and advantages of the present disclosure clearer, embodiments of the present disclosure will be described in detail with reference to the accompanying drawings. It is to be noted that implementations may be practiced in a plurality of different forms. Those of ordinary skills in the art may easily understand such a fact that implementations and contents may be transformed into various forms without departing from the purpose and scope of the present disclosure. Therefore, the present disclosure should not be explained as being limited to contents described in following implementations only. The embodiments in the present disclosure and features in the embodiments may be combined randomly with each other if there is no conflict.

In the drawings, a size of a constituent element, a thickness of a layer, or a region is exaggerated sometimes for clarity. Therefore, one implementation of the present disclosure is not necessarily limited to the size, and shapes and sizes of various components in the drawings do not reflect actual scales. In addition, the drawings schematically illustrate ideal examples, and one implementation of the present disclosure is not limited to shapes, numerical values, or the like shown in the drawings.

Ordinal numerals such as "first", "second", and "third" in the specification are set to avoid confusion between constituent elements, but not to set a limit in quantity.

In the specification, for convenience, wordings indicating orientation or positional relationships, such as "middle", "upper", "lower", "front", "back", "vertical", "horizontal", "top", "bottom", "inside", and "outside", are used for illustrating positional relationships between constituent elements with reference to the drawings, and are merely for facilitating the description of the specification and simplifying the description, rather than indicating or implying that a referred apparatus or element must have a particular orientation and be constructed and operated in the particular orientation. Therefore, they cannot be understood as limitations on the present disclosure. The positional relationships between the constituent elements are changed as appropriate according to directions for describing the various constituent elements. Therefore, appropriate replacements may be made according to situations without being limited to the wordings described in the specification.

In the specification, unless otherwise specified and defined explicitly, terms "mount", "mutually connect", and "connect" should be understood in a broad sense. For example, a connection may be a fixed connection, or a detachable connection, or an integrated connection; it may be a mechanical connection or an electrical connection; and it may be a direct mutual connection, or an indirect connection through middleware, or an internal communication between two elements. Those of ordinary skills in the art may understand specific meanings of these terms in the present disclosure according to specific situations.

In the specification, a transistor refers to an element which at least includes three terminals, i.e., a gate electrode, a drain electrode and a source electrode. The transistor has a channel region between the drain electrode (drain electrode terminal, drain region, or drain) and the source electrode (source electrode terminal, source region, or source), and a current can flow through the drain electrode, the channel region, and the source electrode. It is to be noted that, in the specification, the channel region refers to a region through which the current mainly flows.

In the specification, a first electrode may be a drain electrode, and a second electrode may be a source electrode; or, the first electrode may be a source electrode, and the second electrode may be a drain electrode. In cases that transistors with opposite polarities are used, a current direction changes during operation of a circuit, or the like, functions of the "source electrode" and the "drain electrode" are sometimes interchanged. Therefore, the "source electrode" and the "drain electrode" are interchangeable in the specification.

In the specification, "electrical connection" includes a case that constituent elements are connected together through an element with a certain electrical effect. The "element with a certain electrical effect" is not particularly limited as long as electrical signals may be sent and received between the connected constituent elements. Examples of the "element with a certain electrical effect" not only include electrodes and wirings, but also include switch elements such as transistors, resistors, inductors, capacitors, other elements with various functions, etc.

In the specification, "parallel" refers to a state in which an angle formed by two straight lines is above −10° and below 10°, and thus also includes a state in which the angle is above −5° and below 5°. In addition, "perpendicular" refers to a state in which an angle formed by two straight lines is above 80° and below 100°, and thus also includes a state in which the angle is above 85° and below 95°.

In the specification, a "film" and a "layer" are interchangeable. For example, a "conductive layer" may be replaced with a "conductive film" sometimes. Similarly, an "insulating film" may be replaced with an "insulating layer" sometimes.

In the present disclosure, "about" refers to that a boundary is defined not so strictly and numerical values within process and measurement error ranges are allowed.

Figure 2:
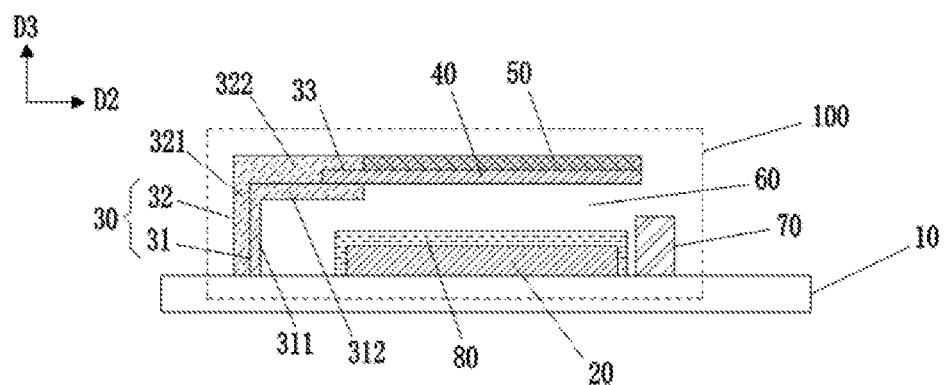
FIG. 2 is a first schematic diagram of a cross section of a humidity sensor according to an exemplary embodiment along a direction perpendicular to a base substrate.

FIG. 1 is a schematic diagram of a structure of a humidity sensor according to an exemplary embodiment, and FIG. 2 is a first schematic diagram of a cross section of a humidity sensor according to an exemplary embodiment along a direction perpendicular to a base substrate. Herein, FIG. 2 may be a schematic diagram of a cross section of the humidity sensor in FIG. 1 along the direction perpendicular to the base substrate, and the direction perpendicular to the base substrate may be a third direction D3 in FIG. 2. As shown in FIG. 1 and FIG. 2, the humidity sensor according to this embodiment may include a base substrate 10, and at least one sensor unit 100 arranged on the base substrate 10.

In some embodiments, the humidity sensor may include a plurality of sensor units arranged in an array on the base substrate.

In an exemplary embodiment, as shown in FIG. 1 and FIG. 2, a sensor unit 100 may include: a first electrode 20 and a support structure 30, and the first electrode 20 and the support structure 30 are both arranged on the base substrate 10. The support structure 30 is located on at least one side of the first electrode 20. For example, the support structure 30 may be located on a side of the first electrode 20 in a second direction D2, or the support structure 30 may be located on two opposite sides of the first electrode 20 in the second direction D2. The support structure 30 includes a first support layer 31 and a second support layer 32 which are stacked on the base substrate 10, and at least a portion of the first support layer 31 is located on at least one side of the first electrode 20, and at least a portion of the first support layer 31 is located on a side of the first electrode 20 away from the base substrate 10. At least a portion of the second support layer 32 is disposed to be suspended on a side of the first support layer 31 away from the base substrate 10, and a fixation groove 33 is formed between the second support layer 32 and the first support layer 31. The fixation groove 33 extends along the second direction D2, an opening of the fixation groove 33 faces a second electrode 40, and the fixation groove 33 is configured to fix the second electrode 40 to prevent the second electrode 40 from collapsing effectively and increase mechanical stability. Herein, a first direction D1 and the second direction D2 are both parallel to a plane where the base substrate 10 is located, and the first direction D1 intersects with the second direction D2, for example, the first direction D1 is perpendicular to the second direction D2.

The sensor unit 100 may include a second electrode 40, and the second electrode 40 is located on the side of the first electrode 20 away from the base substrate 10. An orthographic projection of the second electrode 40 on the base substrate 10 is overlapped with an orthographic projection of the first electrode 20 on the base substrate 10. Space 60 is provided between the second electrode 40 and the first electrode 20, and the space is used for providing a space for the second electrode 40 to bend towards a direction close to the first electrode 20, thereby changing the capacitance between the first electrode 20 and the second electrode 40 and achieving a humidity detection. At least one end of the second electrode 40 extends into the fixation groove 33, so that the fixation groove 33 fixes the second electrode 40.

An adsorption layer 50, the adsorption layer 50 is arranged on a side of the second electrode 40 away from the base substrate 10, and at least a portion of the adsorption layer 50 is exposed outside the sensor unit 100, i.e. at least a portion of a surface of the adsorption layer 50 is a portion of an outer surface of the sensor unit 100. For example, a top surface of the adsorption layer 50 is exposed outside of the sensor unit 100, i.e. the top surface of the adsorption layer 50 is a portion of a top surface of the sensor unit 100.

In an exemplary embodiment, the base substrate 10 may include a glass material. In the humidity sensor according to the embodiment of the present application, the sensor unit 100 is manufactured on the glass substrate 10 by an MEMS process, which can reduce cost, make the humidity sensor miniaturized and integrated, and may integrate the humidity sensor with the display substrate.

In an exemplary embodiment, the adsorption layer 50 may include a resin adhesive material. The resin adhesive material may be used as a water absorbing material to form the adsorption layer 50 by a patterning process, and the moisture in the resin adhesive material may be released by a heating process, so that the resin adhesive material may be reused and the cost may be reduced.

The humidity sensor according to the embodiment of the present application may test a known humidity environment, and absorb water vapor molecules in the external environment through the adsorption layer 50 to increase its own weight, thereby providing pressure to the second electrode 40, which makes the second electrode 40 bend towards the first electrode 20, thus changing a capacitance value between the first electrode 20 and the second electrode 40, and calibrating a linear change of the capacitance value corresponding to the humidity through a change of the capacitance value. For example, taking that a dimension of the adsorption layer 50 is 20 μm*10 μm*1 μm, its material is a resin adhesive, which has a density of 1.117 g/cm3 as an example, a dimension of the second electrode 40 is 20

μm*10 μm*0.3 μm, and its material is metal aluminum, which has a density of 2.7 g/cm$^3$, and when the adsorption layer 50 absorbs water vapor molecules, the weight of the adsorption layer 50 becomes larger, and the weight of the adsorption layer 50 after being increased may reach dozens of times or hundreds of times or even thousands of times of a weight of the second electrode 40. The humidity sensor of the embodiment of the present application utilizes the adsorption layer 50 to become heavier after absorbing water vapor molecules, and the gravity of the adsorption layer 50 makes the second electrode 40 bend towards the first electrode 20, thereby changing the capacitance value between the first electrode 20 and the second electrode 40. The humidity sensor according to the embodiment of the application has good linearity, accurate detection and simple detection principle.

In the humidity sensor according to the embodiment of the present application, the second electrode 40 is fixed by the fixation groove 33 formed between the first support layer 31 and the second support layer 32, which can effectively prevent the second electrode 40 from collapsing, making the second electrode 40 flatter, and ensuring the stability of fixing the second electrode 40.

The humidity sensor according to the embodiment of the application may be applied to humidity detection of working environment, for example, scenes in agricultural and animal husbandry industrial parks, greenhouses and the like, and is equipped with Internet of Things equipment such as wireless network-detectors, which may monitor air relative humidity in real time.

Solutions of the embodiments will be described below through some examples.

In an exemplary embodiment, as shown in FIG. 1 and FIG. 2, in the humidity sensor according to this embodiment, the first electrode 20 may be in shape of a strip extending along the first direction D1, and the second electrode 40 may be in a shape of a plate, the second electrode 40 extends along the second direction D2 and is disposed to be suspended on the side of the first electrode 20 away from the base substrate 10, and the space 60 is provided between the second electrode 40 and the first electrode 20.

In an exemplary embodiment, the orthographic projection of the second electrode 40 on the base substrate 10 may have a variety of shapes, for example, regular or irregular shapes such as a rectangle, a triangle, a circle, a diamond, an ellipse, and a polygon.

In some other embodiments, a plurality of second electrodes may be arranged at intervals along the first direction D1, and orthographic projections of the plurality of second electrodes on the base substrate are all overlapped with the orthographic projection of the first electrode on the base substrate, so that the plurality of sensor units may share one first electrode.

In an exemplary embodiment, both the first electrode 20 and the second electrode 40 may be made of a metal material, for example, copper aluminum or the like.

In an exemplary embodiment, as shown in FIG. 2, the humidity sensor according to this embodiment further includes a dielectric layer 80, the dielectric layer 80 is arranged on the first electrode 20 and is spaced from the second electrode 40 through the space 60, and the dielectric layer 80 at least covers a surface of the first electrode 20. For example, the first electrode 20 has a top/bottom surface and a side surface, and the dielectric layer 80 covers the top/bottom surface and the side surface of the first electrode 20. The dielectric layer 80 is configured to protect the first electrode 20. Herein, the dielectric layer 80 may be made of an inorganic material, such as silicon nitride (SiN$_x$) or silicon oxide (SiO) or the like.

In an exemplary embodiment, as shown in FIG. 2, the support structure 30 is located on a side of the first electrode 20 in the second direction D2. The first support layer 31 of the support structure 30 includes a first support part 311 and a first cantilever part 312 connected to each other, and the first support part 311 is arranged on the base substrate 10 and is located on a side of the first electrode 20. An orthographic projection of the first support part 311 on the base substrate is not overlapped with the orthographic projection of the first electrode 20 on the base substrate, and a spacing is provided between a side surface of the first support part 311 and the side surface of the first electrode 20. The first cantilever part 312 and an end of the first support part 311 away from the base substrate 10 are disposed to intersect with each other, and the first cantilever part 312 is located on a side the first electrode 20 away from the base substrate 10, suspended above the first electrode 20 and separated from the first electrode 20 by the space 60. An orthographic projection of an end of the first cantilever part 312 away from the first support part 311 on the base substrate is overlapped with the orthographic projection of the first electrode 20 on the base substrate.

In an exemplary embodiment, as shown in FIG. 2, the second support layer 32 of the support structure 30 includes a second support part 321 and a second cantilever part 322 connected to each other, and the second support part 321 is arranged on the base substrate 10 and is located on a side of the first support part 311 away from the first electrode 20, and an orthographic projection of the second support part 321 on the base substrate is not overlapped with the orthographic projection of the first electrode 20 on the base substrate. The second cantilever part 322 and an end of the second support part away from base substrate 10 are disposed to intersect with each other, and the second cantilever part 322 is located on a side of the first cantilever part 312 away from the first electrode 20 and above suspended on the first electrode 20. An orthographic projection of an end of the second cantilever part 322 away from the second support part 321 on the base substrate is overlapped with the orthographic projection of the first electrode 20 on the base substrate, and the fixation groove 33 is provided between the end of the second cantilever part 322 away from the second support part 321 and the end of the first cantilever part 312 away from the first support part 311. The fixation groove 33 extends along the second direction D2, and an opening of the fixation groove 33 faces the second direction D2. In a cross section perpendicular to a plane where the base substrate 10 is located and the fixation groove 33 is a U-shaped groove.

In an exemplary embodiment, as shown in FIG. 2, an orthographic projection of the fixation groove 33 on the base substrate is overlapped with the orthographic projection of the first electrode 20 on the base substrate, while the orthographic projection of the fixation groove 33 on the base substrate is not overlapped with the orthographic projection of the adsorption layer 50 on the base substrate. One end of the second electrode 40 extends into the fixation groove 33, which enables the fixation groove 33 to fix the second electrode 40. The orthographic projection of the fixation groove 33 on the base substrate coincides with the orthographic projection of the end of the second electrode 40 on the base substrate.

The above-mentioned structure of the fixation groove 33 of the humidity sensor according to the embodiment of the present application can fix the second electrode 40, which effectively prevents the second electrode 40 from collapsing, makes the second electrode 40 flatter, and ensure the stability of fixing the second electrode 40.

In an exemplary embodiment, as shown in FIG. 2, in a cross section perpendicular to the plane where the base substrate 10 is located, the first support layer 31 is in a shape of an inverted L, and the first support part 311 of the first support layer 31 extends along a thickness direction of the base substrate 10. The first cantilever part 312 extends along the second direction D2, the first cantilever part 312 is parallel to a plane where the base substrate 10 is located, and an end of the first cantilever part 312 close to the first support part 311 is vertically connected with an end of the first support part 311.

In an exemplary embodiment, as shown in FIG. 2, in the cross section perpendicular to a plane where the base substrate 10 is located, the second support layer 32 is in a shape of an inverted L, the second support part 321 of the second support layer 32 extends along a thickness direction of the base substrate 10, the second cantilever part 322 extends along the second direction D2, the second cantilever part 322 is parallel to a plane where the base substrate 10 is located, one end of the second cantilever part 322 close to the second support part 321 is vertically connected to the second support part 321, the end of the second cantilever part 322 away from the second support part 321 is provided with an L-shaped notch, and the fixation groove 33 is formed by the L-shaped notch and the end of the first cantilever part 312 away from the first support part 311.

In an exemplary embodiment, as shown in FIG. 2, a side surface of the first support part 311 away from the first electrode 20 is in contact with a side surface of the second support part 321 close to the first electrode 20. A portion of the first cantilever part 312 close to the first support part 311 is in contact with a portion of the second cantilever part 322 close to the second support part 321, and the fixation groove 33 is formed between an end of the first cantilever part 312 away from the first support part 311 and an end of the second cantilever part 322 away from the second support part 321.

In an exemplary embodiment, as shown in FIG. 2, an end surface of the first cantilever part 312 away from the first support part 311 is flush with an end surface of the second cantilever part 322 away from the second support part 321.

In an exemplary embodiment, both the first support layer 31 and the second support layer 32 may include a hard metal material, thereby increasing the strength of the first support layer 31 and the second support layer 32 and ensuring the stability of the second electrode.

In an exemplary embodiment, as shown in FIG. 1 and FIG. 2, the humidity sensor according to the embodiment of the present application further includes an anti-adhesion post 70, the anti-adhesion post 70 is arranged on the base substrate 10 and located on a side of the first electrode 20, and the anti-adhesion post 70 and the support structure 30 are located on different sides of the first electrode 20, for example, the anti-adhesion post 70 is located on a side of the first electrode 20 away from the support structure 30. An orthographic projection of the anti-adhesion post 70 on the base substrate is not overlapped with the orthographic projection of the first electrode 20 on the base substrate, and a spacing is provided between a side surface of the anti-adhesion post 70 and a side surface of the first electrode 20. The orthographic projection of the anti-adhesion post 70 on the base substrate is overlapped with an orthographic projection of an end of the second electrode 40 away from the support structure 30 on the base substrate, and a top surface of the anti-adhesion post 70 is located on a side of a top surface of the first electrode 20 away from the base substrate 10. When the second electrode 40 is bent to be too close to the first electrode 20, the anti-adhesion post 70 can prevent the second electrode 40 from approaching the first electrode 20 and prevent breakdown between the second electrode 40 and the first electrode 20. Herein, the top surface is a surface away from the base substrate.

In an exemplary embodiment, the anti-adhesion post 70 may be rectangular in a cross section perpendicular to the plane where the base substrate 10 is located.

In an exemplary embodiment, as shown in FIG. 1 and FIG. 2, an orthographic projection of the adsorption layer 50 on the base substrate 10 is located in an orthographic projection of the second electrode 40 on the base substrate 10. An end surface of the adsorption layer 50 away from the support structure 30 is flush with an end surface of a side of the second electrode 40 away from the support structure 30.

In an exemplary embodiment, as shown in FIG. 2, the orthographic projection of the adsorption layer 50 on the base substrate 10 is overlapped with the orthographic projection of the first electrode 20 on the base substrate 10.

In an exemplary embodiment, as shown in FIG. 2, the orthographic projection of the adsorption layer 50 on the base substrate is not overlapped with orthographic projections of the first support layer 31 and the second support layer 32 on the base substrate 10.

In an exemplary embodiment, the humidity sensor according to the embodiment of the present application further includes a digital controlled circuit, which is connected to at least one sensor unit, and the digital controlled circuit is configured to transmit a drive signal to particular one or more sensor units to perform humidity detection on an external environment.

Figure 12:
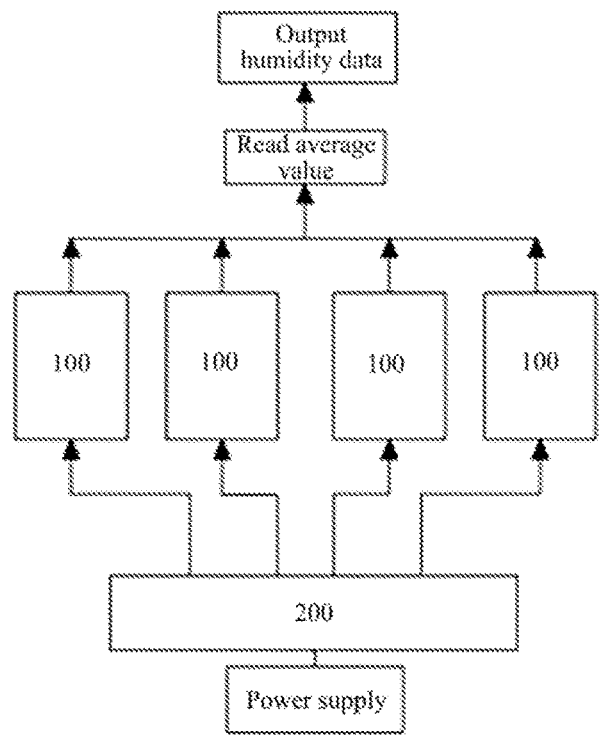
FIG. 12 is a flowchart of detecting humidity by a humidity sensor according to an exemplary embodiment.

FIG. 12 is a flowchart of detecting humidity by a humidity sensor according to an exemplary embodiment. As shown in FIG. 12, the humidity sensor according to the embodiment of the present application further includes a power source, which is electrically connected to a digital controlled circuit 200. A plurality of sensor units 100 may be arranged in an array on the base substrate 10, and the digital controlled circuit 200 is electrically connected to the plurality of sensor units 100 all through leads. When the humidity sensor according to the embodiment of the present application detects an external humidity, the power supply energizes the digital controlled circuit 200, and the digital controlled circuit 200 may power on the plurality of sensor units 100 and transmit a driving signal to the plurality of sensor units 100 to make the plurality of sensor units 100 simultaneously detect the external humidity. Then, an average value of humidity detection values of the plurality of sensor units 100 is read to form humidity data, and finally, the humidity data is output.

In an exemplary embodiment, a quantity of the sensor units 100 in the humidity sensor according to an embodiment of the present application is not limited to the four shown in FIG. 12, and may also be five, six, seven or the like.

In an exemplary embodiment, the humidity sensor according to the embodiment of the present application may independently drive one sensor unit 100 through a digital controlled circuit 200 to perform a detection and output humidity data; or the digital controlled circuit 200 drives certain specific sensor units 100 to perform a detection and reads an average value of humidity detection values of the certain specific sensor units 100 to form humidity data, and finally, the humidity data is output.

A technical solution of this embodiment is further described below through a manufacturing process of the humidity sensor according to this embodiment. The "patterning process" mentioned in this embodiment includes processes such as deposition of a film layer, coating of a photoresist, mask exposure, development, etching, and stripping of photoresist, and is a mature manufacturing process in the related art. A "photolithography process" mentioned in this embodiment includes film layer coating, mask exposure and development, and is a mature manufacturing process in related technologies. The deposition may be a known process such as sputtering, evaporation, chemical vapor deposition, the coating may be a known coating process, and the etching may be a known method, which are not specifically limited here. In the description of this embodiment, it should be understood that a "thin film" refers to a layer of thin film manufactured through a certain material on a base substrate by using a deposition or coating process. If a patterning process or a photo-etching process is not needed for the "thin film" during the entire manufacturing process, the "thin film" may also be referred to as a "layer". If a patterning process or a photo-etching process is needed for the "thin film" during the entire manufacturing process, it is referred to as a "thin film" before the patterning process and referred to as a "layer" after the patterning process. The "layer" after the patterning process or photo-etching process includes at least one "pattern".

In an exemplary embodiment, the manufacturing process of the humidity sensor may include following steps.

Figure 3A:
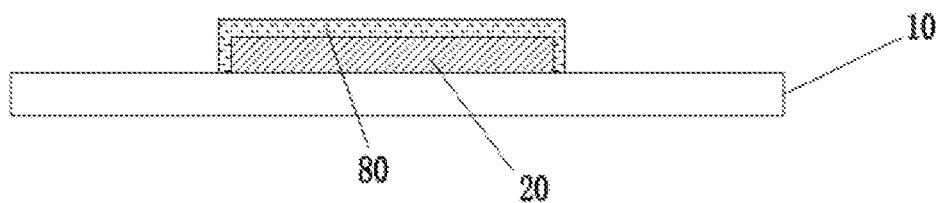
FIG. 3a is a schematic diagram after a first electrode and a dielectric layer are formed during a manufacturing process of a humidity sensor according to an exemplary embodiment.

In Step 101, a first conductive thin film is deposited on the base substrate 10, and a patterning process is performed on the first conductive thin film to form a first electrode 20; and subsequently, a first insulating thin film covering the first electrode 20 is deposited on the base substrate 10, and a patterning process is performed on the first insulating thin film to form a dielectric layer 80, as shown in FIG. 3a.

In an exemplary embodiment, the first conductive thin film and the first insulating thin film may be deposited by using a chemical vapor deposition method.

In an exemplary embodiment, the first conductive thin film may be made of a metal material such as copper aluminum or the like. The first insulating thin film may be made of an inorganic material, such as silicon nitride ($SiN_x$) or silicon oxide (SiO) or the like.

Figure 3B:
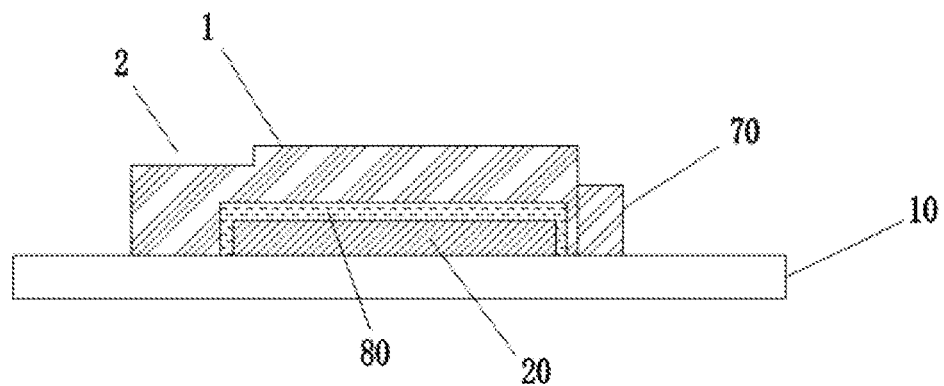
FIG. 3b is a schematic diagram after a first sacrificial layer and an anti-adhesion post are formed during a manufacturing process of a humidity sensor according to an exemplary embodiment.

In Step 102, a first sacrificial layer thin film and an anti-adhesion post thin film are deposited on the base substrate 10 on which the aforementioned patterns are formed, and a patterning process is performed on the first sacrificial layer thin film and the anti-adhesion post thin film, so that the first sacrificial layer thin film forms a first sacrificial layer 1 covering the first electrode 20 and the dielectric layer 80, and the anti-adhesion post thin film forms an anti-adhesion post 70, as shown in FIG. 3b. Herein, the first sacrificial layer 1 covers a side surface and a top surface of the dielectric layer 80 and wraps the first electrode 20 and the dielectric layer 80. An L-shaped groove 2 is provided on a side of the top surface of the first sacrificial layer 1 away from the anti-adhesion post 70. A side surface of the first sacrificial layer 1 is in contact with a side surface of the anti-adhesion post 70.

Figure 3C:
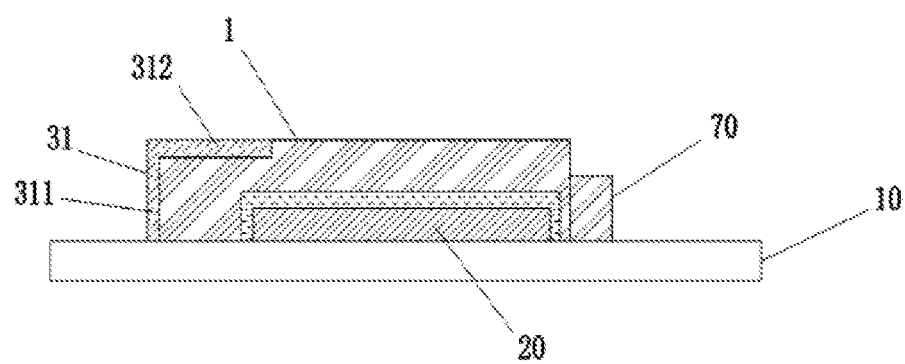
FIG. 3c is a schematic diagram after a first support layer is formed during a manufacturing process of a humidity sensor according to an exemplary embodiment.

In Step 103, a first metal thin film covering the first sacrificial layer 1 is deposited on the base substrate 10 on which the aforementioned patterns are formed, and a patterning process is performed on the first metal thin film to form a first support layer 31, as shown in FIG. 3c. Herein, a side surface of the first support part 311 of the first support layer 31 is in contact with the side surface of the first sacrificial layer 1, and the first cantilever part 312 of the first support layer 31 is located in the L-shaped groove 2 on the top surface of the first sacrificial layer 1.

Figure 3D:
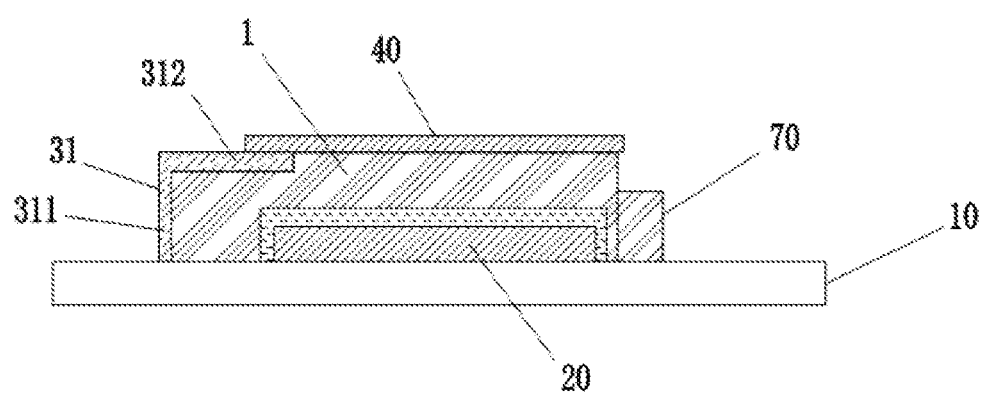
FIG. 3d is a schematic diagram after a second electrode is formed during a manufacturing process of a humidity sensor according to an exemplary embodiment.

In Step 104, a second conductive thin film covering the first support layer 31 and the first sacrificial layer 1 is deposited on the base substrate 10 on which the aforementioned patterns are formed, and a patterning process is performed on the second conductive thin film to form a second electrode 40, as shown in FIG. 3d. Herein, an orthographic projection of one end of the second electrode 40 close to the first support layer 31 on the base substrate 10 is overlapped with an orthographic projection of the first cantilever part 312 of the first support layer 31 on the base substrate 10, and an orthographic projection of an end of the second electrode 40 away from the first support layer 31 on the base substrate 10 is overlapped with an orthographic projection of the anti-adhesion post 70 on the base substrate 10.

Figure 3E:
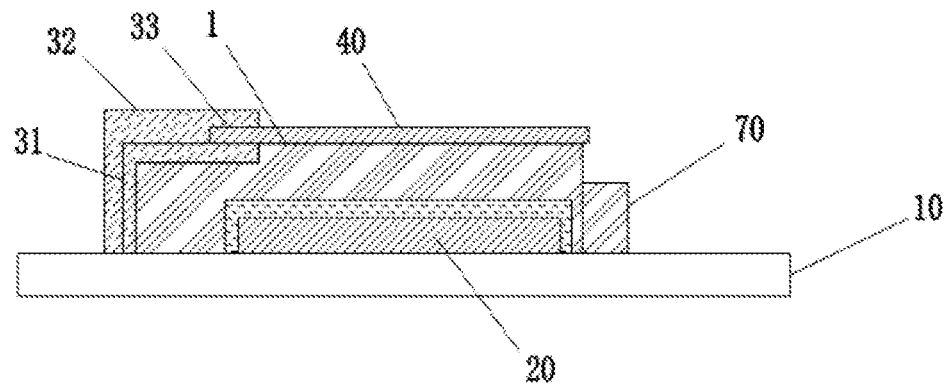
FIG. 3e is a schematic diagram after a second support layer is formed during a manufacturing process of a humidity sensor according to an exemplary embodiment.

In Step 105, a second metal thin film covering the first support layer 31 and the second electrode 40 is deposited on the base substrate 10 on which the aforementioned patterns are formed, and a patterning process is performed on the second metal film to form a second support layer 32, as shown in FIG. 3e. Herein, a side surface of the second support part of the second support layer 32 is in contact with the side surface of the first support part of the first support layer 31, a second cantilever part of the second support layer 32 is arranged on the first cantilever part of the first support layer 31, and an end of the second cantilever part of the second support layer 32 away from the second support part covers the end of the second electrode 40, so that the end of the second electrode 40 is fixed in the fixation groove 33 formed by the end of the second cantilever part and the end of the first cantilever part.

Figure 3F:
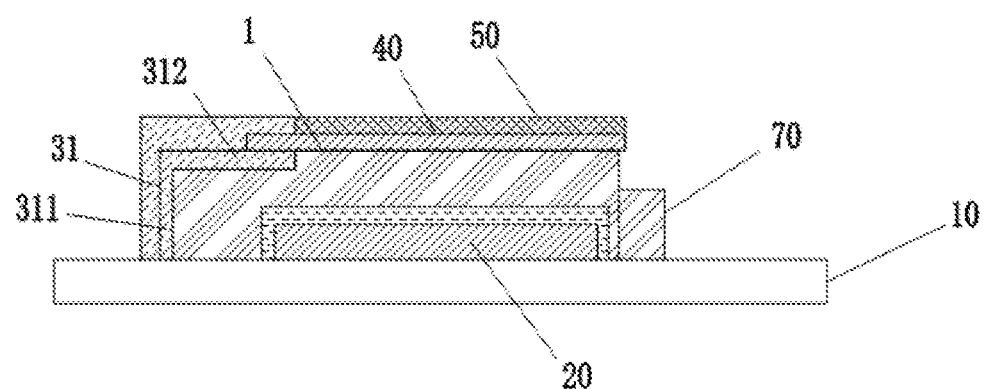
FIG. 3f is a schematic diagram after an adsorption layer is formed during a manufacturing process of a humidity sensor according to an exemplary embodiment.

In Step 106, an adsorption layer thin film is deposited on the base substrate 10 on which the aforementioned patterns are formed, and a patterning process is performed on the adsorption layer thin film to form an adsorption layer 50 arranged on the second electrode 40, as shown in FIG. 3f.

In Step 107, the first sacrificial layer is removed from the base substrate 10 on which the aforementioned patterns are formed to form a space 60 located between the second electrode 40 and the first electrode 20, as shown in FIG. 2.

The manufacturing process of the humidity sensor according to this embodiment is simple, and can effectively prevent the second electrode 40 from collapsing, so that the second electrode 40 is flatter, and the stability of fixing the second electrode 40 is ensured.

Figure 4:
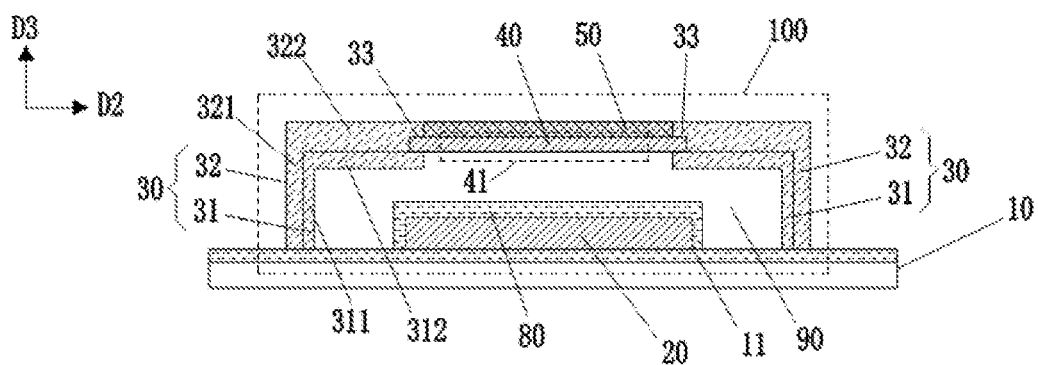
FIG. 4 is a second schematic diagram of a cross section of a humidity sensor according to an exemplary embodiment along a direction perpendicular to a base substrate.

FIG. 4 is a second schematic diagram of a cross section of a humidity sensor according to an exemplary embodiment along a direction perpendicular to a base substrate. In another exemplary embodiment, as shown in FIG. 4, an embodiment of the present application provides another humidity sensor, which is substantially the same as the humidity sensor of the above embodiment (as shown in FIG. 2). The humidity sensor differs from the humidity sensor of the above embodiment in that two support structures 30 are respectively located on two opposite sides of the first electrode 20 in the second direction D2, first support parts 311 and second support parts 321 of the two support structures 30 are respectively located on two opposite sides of the first electrode 20 in the second direction D2. First cantilever parts 312 and second cantilever parts 322 of the two support structures 30 are respectively located on the opposite sides of the first electrode 20 in the second direction D2 and located on a side of the first electrode 20 away from the base substrate 10. Two opposite ends of the second electrode 40 in the direction D2 are respectively fixed in fixation grooves 33 of the two support structures 30, the two support structures 30, the second electrode 40, and the base substrate 10 form an accommodation cavity 90, and at least a portion of the first electrode 20 is located in the accommodation cavity 90.

The humidity sensor according to the embodiment of the present application ensures the stability and flatness of the second electrode 40 through the two support structures 30, and can bend a middle portion 41 of the second electrode 40 towards the first electrode 20 under a pressure provided by the adsorption layer 50. Herein, the middle portion 41 of the second electrode 40 is located between the opposite ends of the second electrode 40 in the second direction D2, an orthographic projection of the middle portion 41 of the second electrode 40 on the base substrate 10 coincides with orthographic projections of both the adsorption layer 50 and the first electrode 20 on the base substrate 10, and the middle portion 41 of the second electrode 40 on the base substrate 10 is not overlapped with orthographic projections of the fixation grooves 33 of the two support structures 30 on the base substrate 10, that is, the middle portion 41 of the second electrode 40 is not arranged in the fixation grooves 33.

In an exemplary embodiment, as shown in FIG. 4, the humidity sensor according to an embodiment of the present application further includes a stress layer 11, which is arranged on the base substrate 10, and is at least partially arranged between the first electrode 20 and the base substrate 10. The stress layer 11 may effectively counteract the stress of the base substrate 10 due to the first electrode 20 and the support structure 30 and prevent the base substrate 10 from cracking.

The technical solution of this embodiment is further described below through a manufacturing process of the humidity sensor according to this embodiment.

In an exemplary embodiment, the manufacturing process of the humidity sensor may include following steps.

Step 201 is the same as the previous step 101.

Figure 5A:
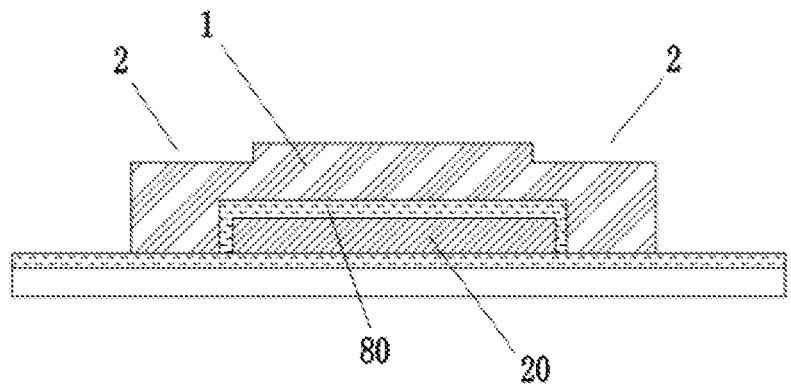
FIG. 5a is a schematic diagram after a first sacrificial layer is formed during a manufacturing process of a humidity sensor according to an exemplary embodiment.

In Step 202, a first sacrificial layer thin film is deposited on the base substrate 10 on which the aforementioned patterns are formed, and a patterning process is performed on the first sacrificial layer thin film, so that the first sacrificial layer thin film forms a first sacrificial layer 1 covering the first electrode 20 and the dielectric layer 80, as shown in FIG. 5a. Herein, the first sacrificial layer 1 covers a side surface and a top surface of the dielectric layer 80 and wraps the first electrode 20 and the dielectric layer 80. L-shaped grooves 2 are provided on both sides of the top surface of the first sacrificial layer 1.

Figure 5B:
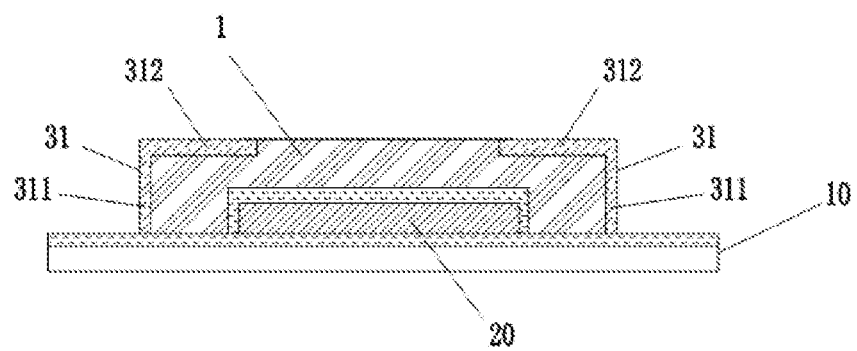
FIG. 5b is a schematic diagram after two first support layers are formed during a manufacturing process of a humidity sensor according to an exemplary embodiment.

In Step 203, a first metal thin film covering the first sacrificial layer 1 is deposited on the base substrate 10 on which the aforementioned patterns are formed, and a patterning process is performed on the first metal thin film to form two first support layers 31, and the two first support layers 31 are located on two opposite sides of the first sacrificial layer 1 and the first electrode 20, as shown in FIG. 5b. Herein, a side surface of the first support part 311 of the first support layer 31 is in contact with z side surface of the first sacrificial layer 1, and the first cantilever part 312 of the first support layer 31 is located in the L-shaped groove 2 on the top surface of the first sacrificial layer 1.

Figure 5C:
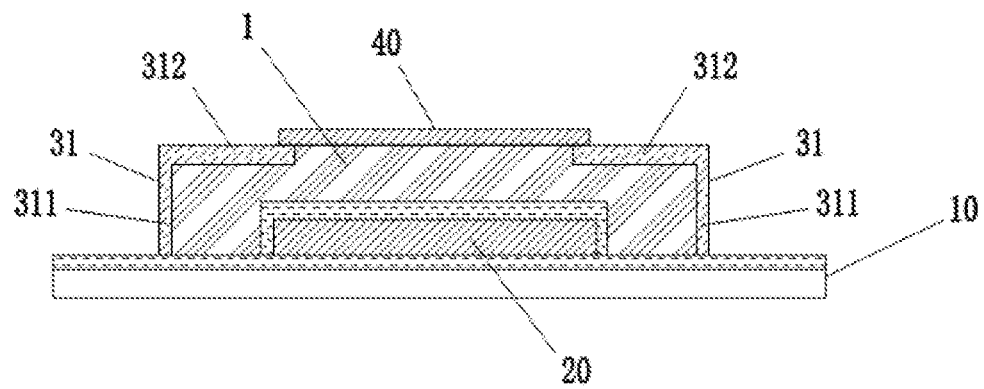
FIG. 5c is a schematic diagram after a second electrode is formed during a manufacturing process of a humidity sensor according to an exemplary embodiment.

In Step 204, a second conductive thin film covering the first support layer 31 and the first sacrificial layer 1 is deposited on the base substrate 10 on which the aforementioned patterns are formed, and a patterning process is performed on the second conductive thin film to form the second electrode 40, as shown in FIG. 5c. Herein, orthographic projections of the two ends of the second electrode 40 on the base substrate 10 are respectively overlapped with orthographic projections of the first cantilever parts 312 of the two first support layers 31 on the base substrate 10.

Figure 5D:
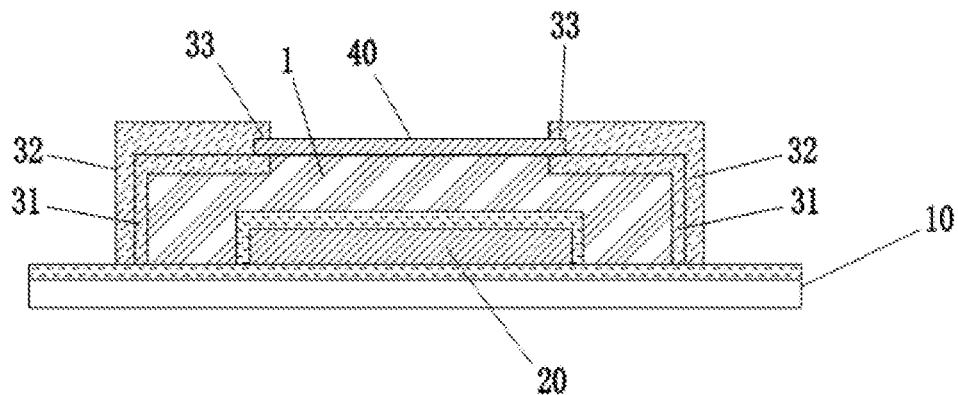
FIG. 5d is a schematic diagram after two second support layers are formed during a manufacturing process of a humidity sensor according to an exemplary embodiment.

In Step 205, a second metal thin film covering the two first support layer 31 and the second electrode 40 is deposited on the base substrate 10 on which the aforementioned patterns are formed, and a patterning process is performed on the second metal thin film to form two second support layers 32, as shown in FIG. 5d. A side surface of the second support part of the second support layer 32 is in contact with a side surface of the first support part of the first support layer 31, a second cantilever part of the second support layer 32 is arranged on the first cantilever part of the first support layer 31. Ends of the second cantilever parts of the two second support layers 32 away from the second support part respectively cover the two ends of the second electrode 40, so that the two ends of the second electrode 40 are fixed in two fixation grooves 33 formed by the ends of the two second cantilever parts and the ends of the two first cantilever parts.

Figure 5E:
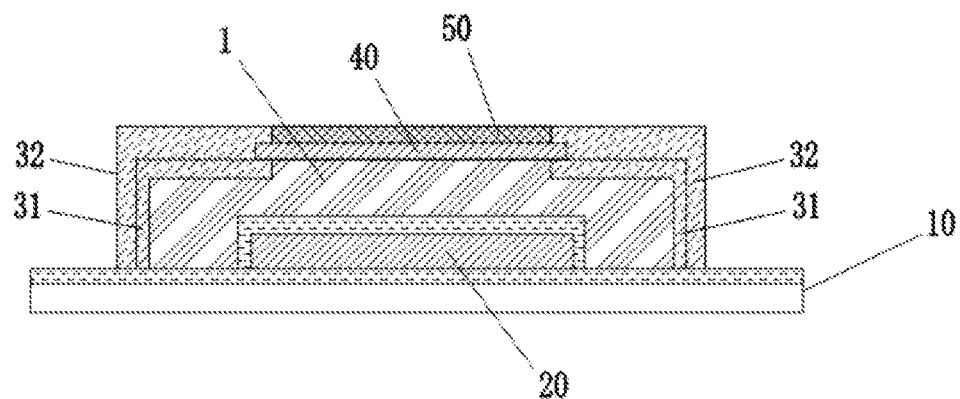
FIG. 5e is a schematic diagram after an adsorption layer is formed during a manufacturing process of a humidity sensor according to an exemplary embodiment.

In Step 206, an adsorption layer thin film is deposited on the base substrate 10 on which the aforementioned patterns are formed, and a patterning process is performed on the adsorption layer thin film to form an adsorption layer 50 arranged on the second electrode 40, as shown in FIG. 5e.

In Step 207, the first sacrificial layer is removed from the base substrate 10 on which the aforementioned patterns are formed to form an accommodation cavity 90, as described in FIG. 4.

Figure 6:
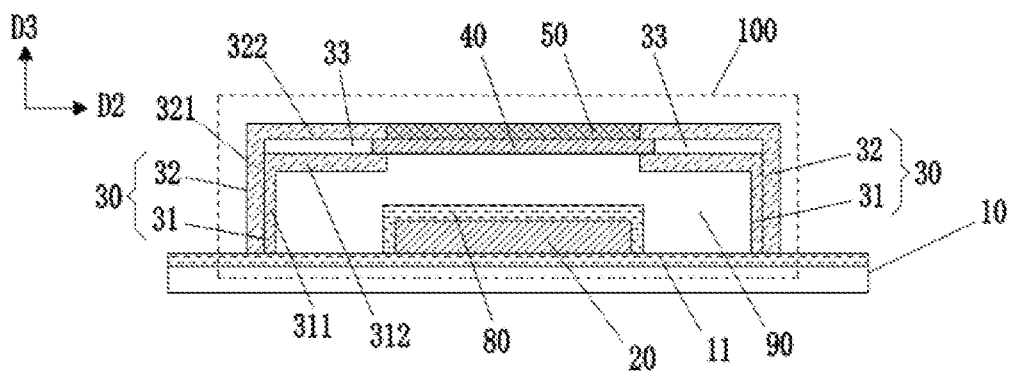
FIG. 6 is a third schematic diagram of a cross section of a humidity sensor according to an exemplary embodiment along a direction perpendicular to a base substrate.

FIG. 6 is a third schematic diagram of a cross section of a humidity sensor according to an exemplary embodiment along a direction perpendicular to a base substrate. In another exemplary embodiment, as shown in FIG. 6, an embodiment of the present application provides another humidity sensor that is substantially the same as the humidity sensor of the above embodiment (the humidity sensor as shown in FIG. 4). The humidity sensor differs from the humidity sensor of the above embodiment in that there is no contact between the entirety of the first cantilever part 312 and the entirety of the second cantilever part 322, and a fixation groove 33 is formed between the entirety of the first cantilever part 312 and the entirety of the second cantilever part 322, i.e. an orthographic projection of the fixation groove 33 on the base substrate 10 coincides with orthographic projections of both the first cantilever part 312 and the second cantilever part 322 on the base substrate 10.

In an exemplary embodiment, as shown in FIG. 6, two ends of the second electrode 40 respectively extend into fixation grooves 33 of the two support structures 30, and orthographic projections of the ends of the fixation grooves 33 away from the second support parts 321 on the base substrate 10 are overlapped with an orthographic projection of the ends of the second electrode 40 on the base substrate 10, so that the fixation grooves 33 of the two support structures 30 can respectively fix the two ends of the second electrode 40, thereby ensuring the mechanical stability of the second electrode 40.

In an exemplary embodiment, as shown in FIG. 6, an orthographic projection of other portions of each fixation groove 33 on the base substrate 10 is not overlapped with the orthographic projection of the second electrode 40 on the base substrate 10 except the portion of the fixation groove 33 which is overlapped with the second electrode 40, forming a cavity located between the first cantilever part 312 and the second cantilever part 322.

The above structure of the fixation groove 33 of the humidity sensor according to the embodiment of the present application can reduce a fixing strength of the second electrode 40 and increase deformation of the second electrode 40 while ensuring the stability of an overall structural of the device, and the adsorption layer 50 can improve a pressing effect of the second electrode 40 under an action of increasing the same gravity.

In an exemplary embodiment, as shown in FIG. 6, an orthographic projection of the fixation groove 33 on the base substrate 10 is not overlapped with an orthographic projection of the first electrode 20 on the base substrate 10. The orthographic projection of the first electrode 20 on the base substrate is within the orthographic projection of the second electrode 40 on the base substrate, so that a length of the first electrode 20 in the second direction D2 is smaller than a length of the second electrode 40 in the second direction D2, which thus makes the orthographic projection of the first electrode 20 on the base substrate not be overlapped with an orthographic projection of the cavity located between the first cantilever part 312 and the second cantilever part 322 on the base substrate, and prevents capacitance formed between the first cantilever part 312 and the second cantilever part 322 from affecting capacitance formed between the first electrode 20 and the second electrode 40.

The technical solution of this embodiment is further described below through a manufacturing process of the humidity sensor according to this embodiment.

In an exemplary embodiment, the manufacturing process of the humidity sensor may include following steps.

Step 301 is the same as the previous step 201.
Step 302 is the same as the previous step 202.
Step 303 is the same as the previous step 203.

Figure 7A:
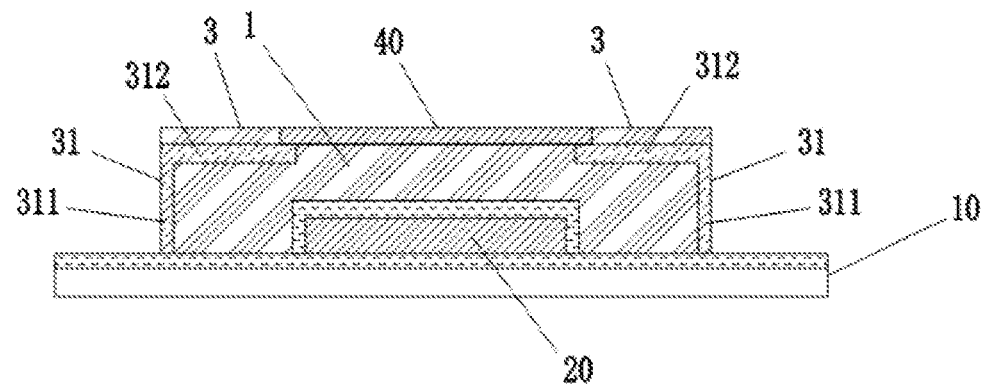
FIG. 7a is a schematic diagram after a second electrode and two second sacrificial layers are formed during a manufacturing process of a humidity sensor according to an exemplary embodiment.

In Step 304, a second conductive thin film covering the first support layer 31 and the first sacrificial layer 1 is deposited on the base substrate 10 on which the aforementioned patterns are formed, and a patterning process is performed on the second conductive thin film to form a second electrode 40. Subsequently, a second sacrificial layer thin film covering the first support layer 31 and the second electrode 40 is deposited on the base substrate 10, and a patterning process is performed on the second sacrificial layer thin film to form two second sacrificial layers 3, the two sacrificial layers 3 are respectively arranged on the two first cantilever parts 312; orthographic projections of the two second sacrificial layers 3 on the base substrate are overlapped with the orthographic projections of the first cantilever parts 312 on the base substrate; the two second sacrificial layers 3 are arranged in a same layer as the second electrode 40, and the orthographic projection of the two second sacrificial layers 3 on the base substrate are not overlapped with the orthographic projection of the second electrode 40 on the base substrate, and surfaces of a side of the two second sacrificial layers 3 away from the base substrate are flush with a surface of a side of the second electrode 40 away from the base substrate, as shown in FIG. 7a. Herein, orthographic projections of two ends of the second electrode 40 on the base substrate 10 are overlapped with the orthographic projections of the first cantilever parts 312 of the two first support layers 31 on the base substrate 10, and two side surfaces of the second electrode 40 are in contact with side surfaces of the two second sacrificial layers 3.

Figure 7B:
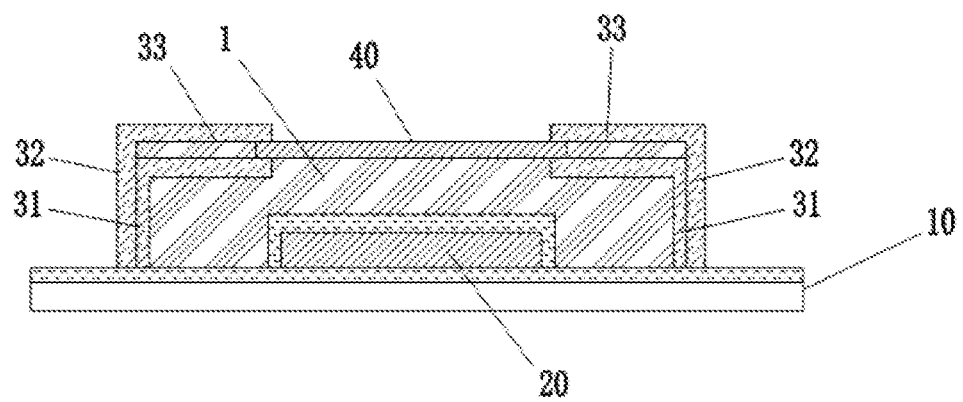
FIG. 7b is a schematic diagram after two second support layers are formed during a manufacturing process of a humidity sensor according to an exemplary embodiment.

In Step 305, a second metal thin film covering the two second sacrificial layers 3 and the second electrode 40 is deposited on the base substrate 10 on which the aforementioned patterns are formed, and a patterning process is performed on the second metal thin film to form two second support layers 32, as shown in FIG. 7b. A side surface of the second support part of each second support layer 32 is in contact with a side surface of the first support part of the respective first support layer 31, a second cantilever part of the second support layer 32 is arranged on the second sacrificial layer 3, and a portion of the second cantilever part of the second support layer 32 is arranged on an end of the second electrode 40, so that two ends of the second electrode 40 are fixed in two fixation grooves 33 formed by the ends of the two second cantilever parts and the ends of the two first cantilever parts respectively.

Figure 7C:
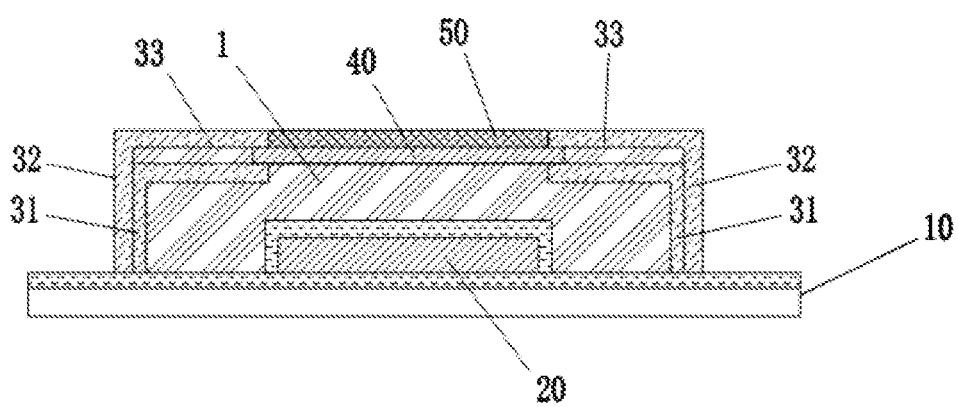
FIG. 7c is a schematic diagram after an adsorption layer is formed during a manufacturing process of a humidity sensor according to an exemplary embodiment.

In Step 306, an adsorption layer thin film is deposited on the base substrate 10 on the base substrate 10 on which the aforementioned patterns are formed, and a patterning process is performed on the adsorption layer thin film to form an adsorption layer 50 arranged on the second electrode 40, as shown in FIG. 7c.

In Step 207, the first sacrificial layer and the second sacrificial layer are removed from the base substrate 10 on which the aforementioned patterns are formed, so that the portion where the first sacrificial layer is removed forms an accommodation cavity 90, and the portion where the second sacrificial layer is removed forms a cavity, as described in FIG. 6.

Figure 8:
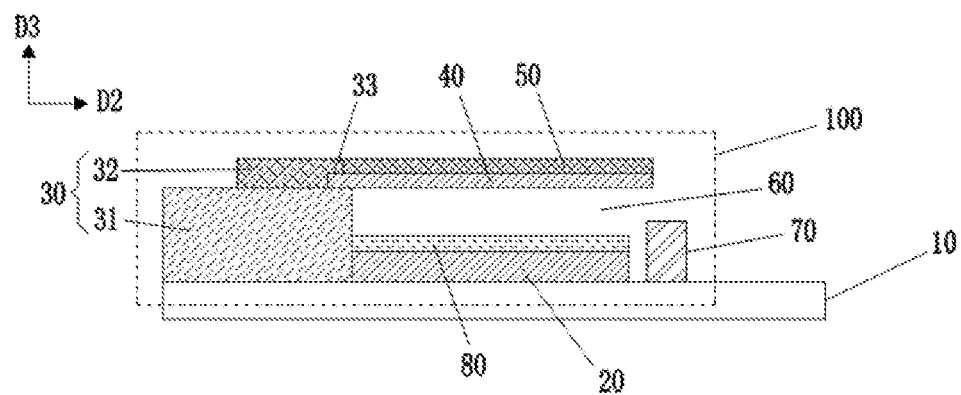
FIG. 8 is a fourth schematic diagram of a cross section of a humidity sensor according to an exemplary embodiment along a direction perpendicular to a base substrate.

FIG. 8 is a fourth schematic diagram of a cross section of a humidity sensor according to an exemplary embodiment along a direction perpendicular to a base substrate. In another exemplary embodiment, as shown in FIG. 8, an embodiment of the present application provides another humidity sensor, which is substantially the same as the humidity sensor of the above embodiment (the humidity sensor as shown in FIG. 2). The humidity sensor differs from the humidity sensor of the above embodiment in that the first support layer 31 and the second support layer 32 are both layered structures, the first support layer 31 is arranged on the base substrate 10, the first support layer 31 is located on a side of the first electrode 20, an orthographic projection of the first support layer 31 on the base substrate 10 is not overlapped with an orthographic projection of the first electrode 20 on the base substrate 10, and a side surface of the first support layer 31 may be in contact with a side surface of the first electrode 20. The second support layer 32 is stacked on the first support layer 31, and is located on a side of the first support layer 31 away from the base substrate 10. An orthographic projection of the second support layer 32 on the base substrate 10 is within the orthographic projection of the first support layer 31 on the base substrate 10, and the orthographic projection of the second support layer 32 on the base substrate 10 is not overlapped with the orthographic projection of the first electrode 20 on the base substrate 10. A fixation groove 33 is formed between an end of the second support layer 32 close to the first electrode 20 and an end of the first support layer 31 close to the first electrode 20.

In an exemplary embodiment, the first support layer 31 may include an optical adhesive. The second support layer 32 may include an inorganic material, for example, a silicon nitride compound ($SiN_x$).

In the humidity sensor according to the embodiment of the present application, the first support layer 31 is formed by the optical adhesive, and the second support layer 32 is formed by an inorganic material with high hardness, so that the second electrode 40 can be fixed more firmly without collapsing, and the reliability of the device can be greatly increased.

In an exemplary embodiment, as shown in FIG. 8, an orthographic projection of the fixation groove 33 on the base substrate 10 is not overlapped with an orthographic projection of the first electrode 20 on the base substrate 10. The orthographic projection of the first electrode 20 on the base substrate is within the orthographic projection of the second electrode 40 on the base substrate, so that a length of the first electrode 20 in the second direction D2 is smaller than a length of the second electrode 40 in the second direction D2.

The technical solution of this embodiment is further described below through a manufacturing process of the humidity sensor according to this embodiment.

In an exemplary embodiment, the manufacturing process of the humidity sensor may include following steps.

Figure 9A:
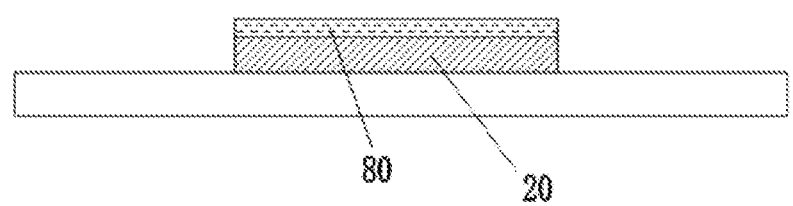
FIG. 9a is a schematic diagram after a first electrode and a dielectric layer are formed during a manufacturing process of a humidity sensor according to an exemplary embodiment.

In Step 401, a first conductive thin film and a first insulating thin film are sequentially deposited on the base substrate 10, and a patterning process is performed on the stacked structure formed by the first conductive thin film and the first insulating thin film, so that the first conductive thin film forms a first electrode 20, and the first insulating thin film forms a dielectric layer 80, as shown in FIG. 9a. Herein, the dielectric layer 80 covers a surface of the first electrode 20 and does not cover a side surface of the first electrode 20 so as to expose the side surface of the first electrode 20.

Figure 9B:
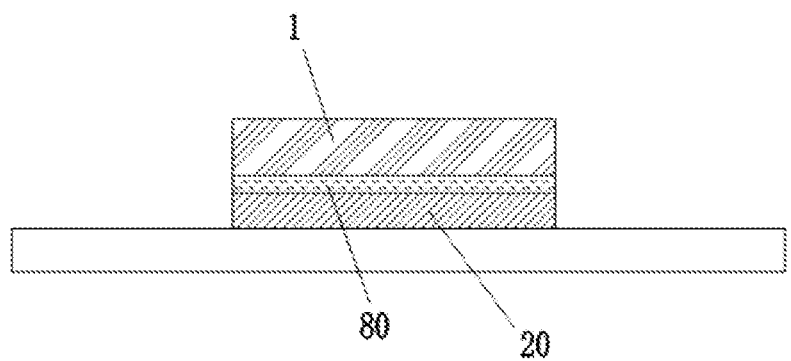
FIG. 9b is a schematic diagram after a first sacrificial layer is formed during a manufacturing process of a humidity sensor according to an exemplary embodiment.

In Step 402, a first sacrificial layer thin film is deposited on the base substrate 10 on which the aforementioned patterns are formed, and a patterning process is performed on the first sacrificial layer thin film, so that the first sacrificial layer thin film forms a first sacrificial layer 1 covering a surface of the dielectric layer 80, as shown in FIG. 9b.

Figure 9C:
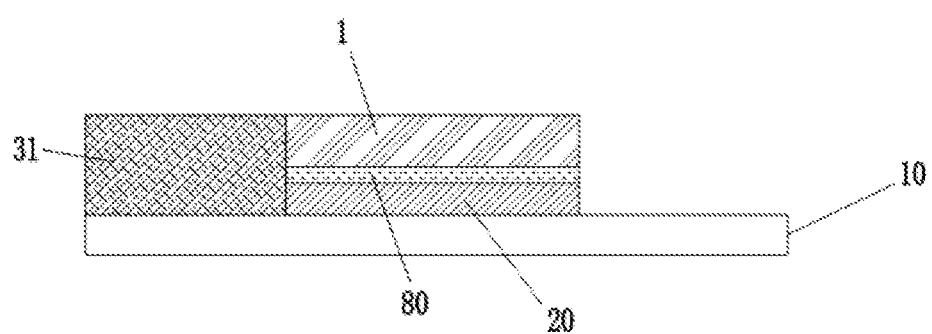
FIG. 9c is a schematic diagram after a first support layer is formed during a manufacturing process of a humidity sensor according to an exemplary embodiment.

In Step 403, an optical adhesive thin film covering the first sacrificial layer 1 is deposited on the base substrate 10 on which the aforementioned patterns are formed, and a patterning process is performed on the optical adhesive thin film to form a first support layer 31, as shown in FIG. 9c. Herein, a side surface of the first support layer 31 are in contact with all of a side surface of the first electrode 20, a side surface of the dielectric layer 80 and a side surface of the first sacrificial layer 1, and a surface of the first support layer 31 away from the base substrate 10 is flush with a surface of the first sacrificial layer 1 away from the base substrate 10.

Figure 9D:
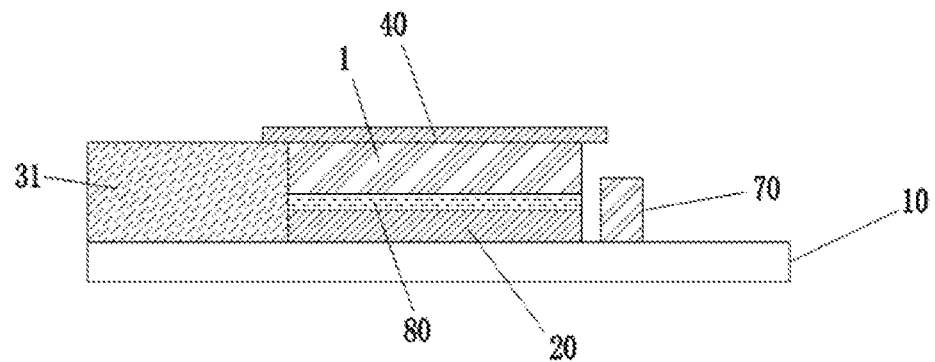
FIG. 9d is a schematic diagram after a second electrode and an anti-adhesion post are formed during a manufacturing process of a humidity sensor according to an exemplary embodiment.

In Step 404, a second conductive thin film is deposited on the base substrate 10 on which the aforementioned patterns are formed, and a patterning process is performed on the second conductive thin film to form a second electrode 40; and subsequently, an anti-adhesion post thin film is deposited on the base substrate 10, and a patterning process is performed on the anti-adhesion post thin film to form an anti-adhesion post 70, as shown in FIG. 9d. Herein, an orthographic projection of one end of the second electrode 40 close to the first support layer 31 on the base substrate 10 is overlapped with the orthographic projection of the first support layer 31 on the base substrate 10. The anti-adhesion post 70 is located on a side of the first electrode 20 away from the first support layer 31, and spacings are provided between the anti-adhesion post 70 and the side surface of the first electrode 20, the anti-adhesion post 70 and the side surface of the dielectric layer 80, and the anti-adhesion post 70 and the side surface of the first sacrificial layer 1. An orthographic projection of the anti-adhesion post 70 on the base substrate 10 is overlapped with the orthographic projection of the second electrode 40 on the base substrate 10, and a surface of the anti-adhesion post 70 away from the base substrate is located on a side away from the base substrate, of the surface of the first electrode 20 away from the base substrate.

Figure 9E:
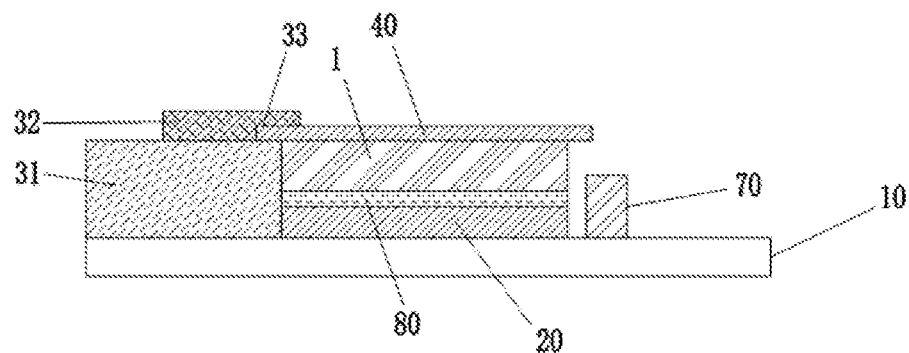
FIG. 9e is a schematic diagram after a second support layer is formed during a manufacturing process of a humidity sensor according to an exemplary embodiment.

In Step 405, an inorganic thin film covering the first support layer 31 and the second electrode 40 is deposited on the base substrate 10 on which the aforementioned patterns are formed, and a patterning process is performed on the inorganic thin film to form a second support layer 32, as shown in FIG. 9e. Herein, one end of the second support layer 32 covers the second electrode 40, so that the end of the second electrode 40 is fixed in the fixation groove 33 formed by the second support layer 32 and the first support layer 31.

Figure 9F:
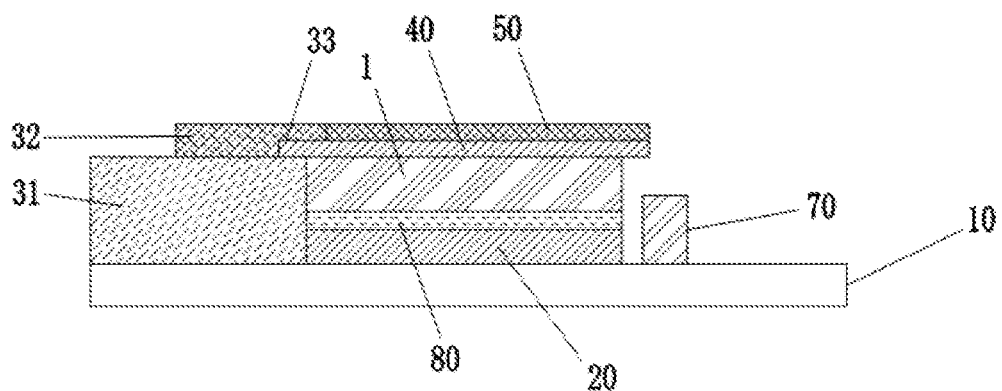
FIG. 9f is a schematic diagram after an adsorption layer is formed during a manufacturing process of a humidity sensor according to an exemplary embodiment.

In Step 406, an adsorption layer thin film is deposited on the base substrate 10 on the base substrate 10 on which the aforementioned patterns are formed, and a patterning process is performed on the adsorption layer thin film to form an adsorption layer 50 arranged on the second electrode 40, as shown in FIG. 9f.

In Step 407, the first sacrificial layer is removed from the base substrate 10 on which the aforementioned patterns are formed to form a space 60 located between the second electrode 40 and the first electrode 20, as shown in FIG. 8.

Figure 10:
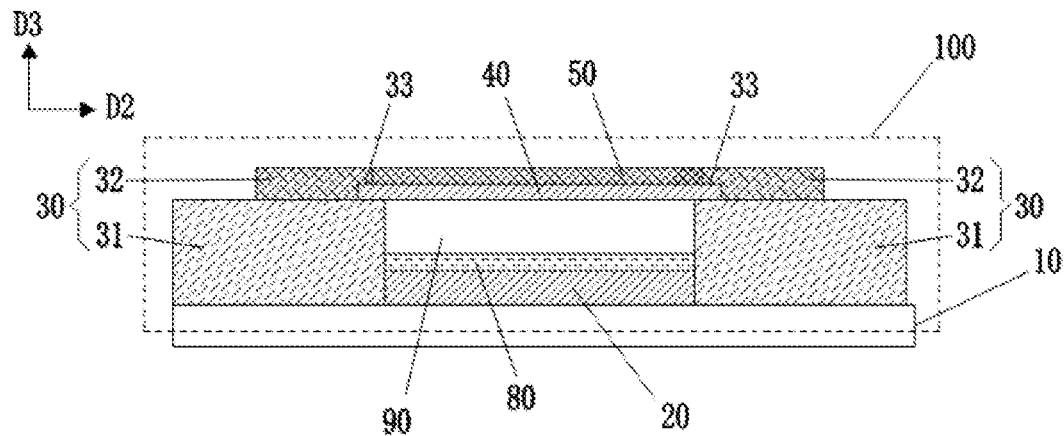
FIG. 10 is a fifth schematic diagram of a cross section of a humidity sensor according to an exemplary embodiment along a direction perpendicular to a base substrate.

FIG. 10 is a fifth schematic diagram of a cross section of a humidity sensor according to an exemplary embodiment along a direction perpendicular to a base substrate. In another exemplary embodiment, as shown in FIG. 10, an embodiment of the present application provides another humidity sensor which is substantially the same as the humidity sensor of the above embodiment (the humidity sensor as shown in FIG. 8). The humidity sensor differs from the humidity sensor of the above embodiment in that two support structures 30 are respectively located on two opposite sides of the first electrode 20 in the second direction D2, and the side surfaces of the first support layers 31 of the two support structures 30 are respectively in contact with two opposite side surfaces of the first electrode 20 in the second direction D2. The opposite ends of the second electrodes 40 in the second direction D2 are respectively fixed in the fixation grooves 33 of the two support structures 30. The two support structures 30, the second electrode 40 and the base substrate 10 form an accommodation cavity 90 in which at least a portion of the first electrodes 20 are located.

The humidity sensor according to the embodiment of the present application ensures the stability and flatness of the second electrode 40 through the two support structures 30.

The technical solution of this embodiment is further described below through a manufacturing process of the humidity sensor according to this embodiment.

In an exemplary embodiment, the manufacturing process of the humidity sensor may include following steps.

Step 501 is the same as the previous step 401.

Step 502 is the same as the previous step 402.

Figure 11A:
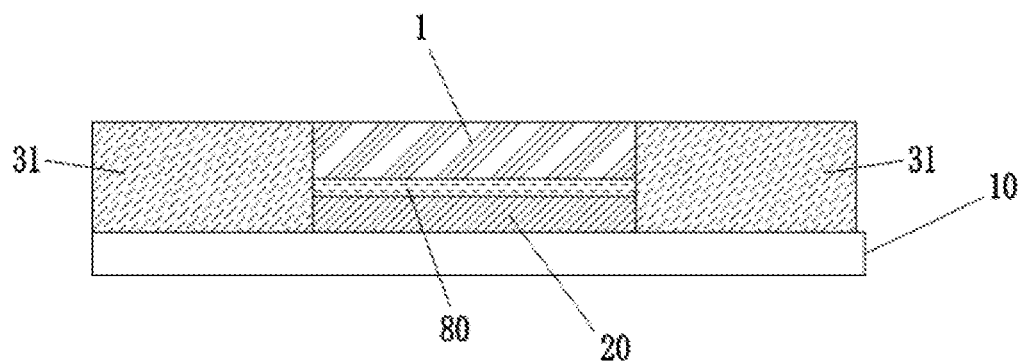
FIG. 11a is a schematic diagram after two first support layers are formed during a manufacturing process of a humidity sensor according to an exemplary embodiment.

In Step 503, an optical adhesive thin film covering the first sacrificial layer 1 is deposited on the base substrate 10 on which the aforementioned patterns are formed, and a patterning process is performed on the optical adhesive thin film to form two first support layers 31, the two first support layers 31 are located on two opposite sides of the first electrode 20, as shown in FIG. 11a. Herein, a side surface of each first support layer 31 is in contact with all of a side surface of the first electrode 20, a side surface of the dielectric layer 80 and a side surface of the first sacrificial layer 1, and a surface of the first support layer 31 away from the base substrate 10 is flush with a surface of the first sacrificial layer 1 away from the base substrate 10.

Figure 11B:
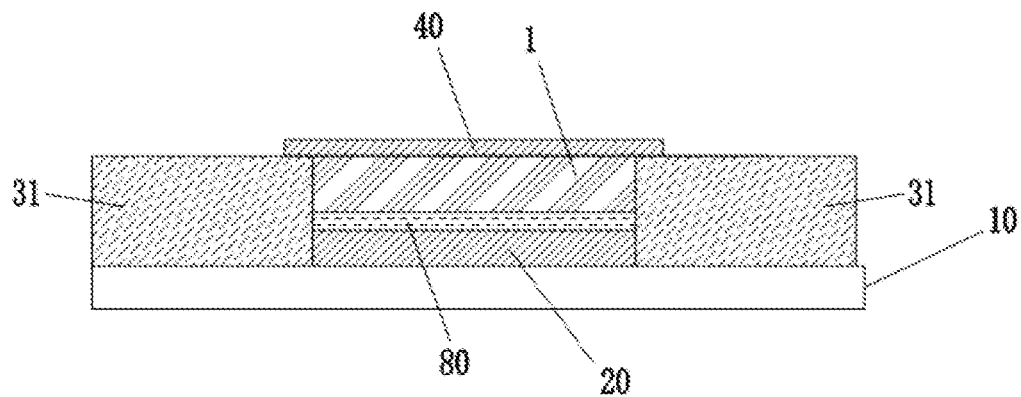
FIG. 11b is a schematic diagram after a second electrode is formed during a manufacturing process of a humidity sensor according to an exemplary embodiment.

In Step 504, a second conductive thin film is deposited on the base substrate 10 on which the aforementioned patterns are formed, and a patterning process is performed on the second conductive thin film to form the second electrode 40, as shown in FIG. 11b. Herein, orthographic projections of the two ends of the second electrode 40 on the base substrate 10 are respectively overlapped with orthographic projections of the two first support layers 31 on the base substrate 10.

Figure 11C:
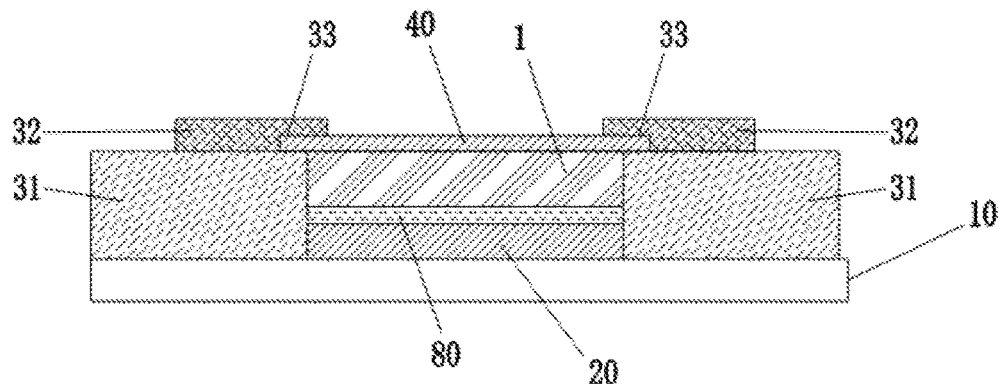
FIG. 11c is a schematic diagram after two second support layers are formed during a manufacturing process of a humidity sensor according to an exemplary embodiment.
Figure 11D:
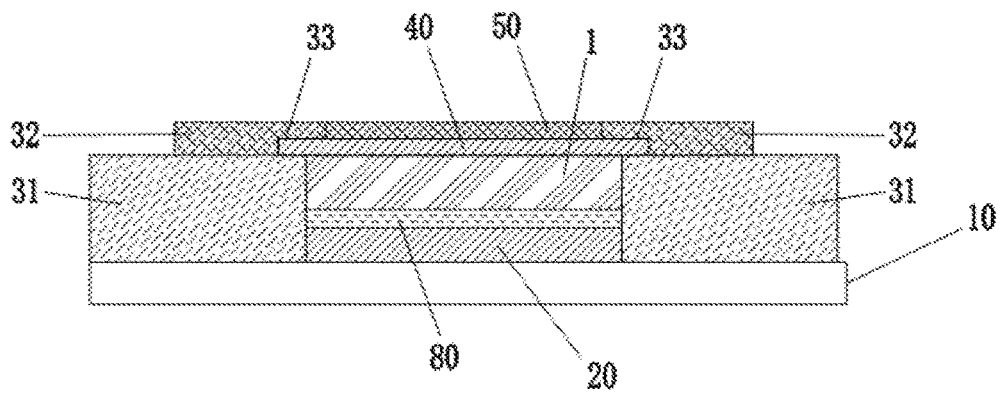
FIG. 11d is a schematic diagram after an adsorption layer is formed during a manufacturing process of a humidity sensor according to an exemplary embodiment.

In Step 505, an inorganic thin film covering the two first support layers 31 and the second electrode 40 is deposited on the base substrate 10 on which the aforementioned patterns are formed, and a patterning process is performed on the inorganic thin film to form two second support layers 32, and the two second support layers 32 are respectively arranged on the two first support layers 31, as shown in FIG. 11c. Herein, the two second support layers 32 respectively cover two ends of the second electrode 40, so that the two ends of the second electrode 40 are fixed in two fixation grooves 33 formed by the two second support layers 32 and the two first support layers 31 respectively.

In Step 506, an adsorption layer thin film is deposited on the base substrate 10 on the base substrate 10 on which the aforementioned patterns are formed, and a patterning process is performed on the adsorption layer thin film to form an adsorption layer 50 arranged on the second electrode 40, as shown in FIG. 9d.

In Step 507, the first sacrificial layer is removed from the base substrate 10 on which the aforementioned patterns are formed, so that the portion where the first sacrificial layer is removed forms an accommodation cavity 90, as shown in FIG. 10.

Figure 13:
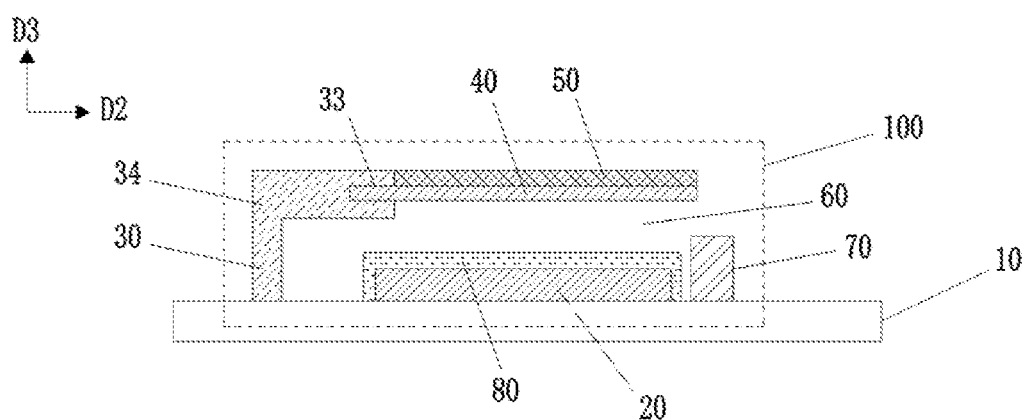
FIG. 13 is a sixth schematic diagram of a cross section of a humidity sensor according to an exemplary embodiment along a direction perpendicular to a base substrate.

FIG. 13 is a sixth schematic diagram of a cross section of a humidity sensor according to an exemplary embodiment along a direction perpendicular to a base substrate. In another exemplary embodiment, as shown in FIG. 13, an embodiment of the present application provides another humidity sensor which is substantially the same as the humidity sensor of the above embodiment (the humidity sensor as shown in FIG. 2). The humidity sensor differs from the humidity sensor of the above embodiment in that the support structure 30 includes a single-layer support layer 34, a fixation groove 33 is provided on a side of the single-layer support layer 34 close to the second electrode 40, and at least one end of the second electrode 40 is fixed in the fixation groove 33.

In an exemplary embodiment, the support structure 30 may be located on a side of the first electrode 20; or the support structure 30 may be located on two opposite sides of the first electrode 20.

An embodiment of the application further provides an electronic device, including the humidity sensor described in any one of the preceding embodiments.

An embodiment of the present application further provides a method for manufacturing a humidity sensor, including:

forming a first electrode on a base substrate;

forming a support structure on the base substrate, wherein the support structure is located on at least one side of the first electrode and includes a first support layer and a second support layer which are stacked, the first support layer is arranged on the base substrate, at least a portion of the second support layer is arranged on a side of the first support layer away from the base substrate, and a fixation groove is formed between the at least portion of the second support layer and the first support layer;

forming a second electrode on the first electrode, wherein an orthographic projection of the second electrode on the base substrate is overlapped with an orthographic projection of the first electrode on the base substrate, and a space is provided between the second electrode and the first electrode; at least one end of the second electrode is fixed in the fixation groove; and forming an adsorption layer on the second electrode.

The drawings of the present disclosure only involve structures involved in the present disclosure, and other structures may refer to conventional designs. The embodiments of the present disclosure, i.e., features in the embodiments, may be combined with each other to obtain new embodiments if there is no conflict.

Those of ordinary skills in the art should understand that modifications or equivalent replacements may be made to the technical solutions of the present disclosure without departing from the essence and scope of the technical solutions of the present disclosure, and shall all fall within the scope of the claims of the present disclosure.

The invention claimed is:

1. A humidity sensor, comprising:
a base substrate;
at least one sensor unit arranged on the base substrate;
the at least one sensor unit comprises:
a first electrode and a support structure which are arranged on the base substrate, wherein the support structure is located on at least one side of the first electrode;
a second electrode located on a side of the first electrode away from the base substrate, wherein an orthographic projection of the second electrode on the base substrate is overlapped with an orthographic projection of the first electrode on the base substrate, and a space is provided between the second electrode and the first electrode; at least one end of the second electrode is fixed to the support structure; and
an adsorption layer arranged on a side of the second electrode away from the base substrate.

2. The humidity sensor according to claim 1, wherein the support structure comprises a first support layer and a second support layer which are stacked, the first support layer is arranged on the base substrate, at least a portion of the second support layer is arranged on a side of the first support layer away from the base substrate, and a fixation groove is formed between the at least portion of the second support layer and the first support layer; and at least one end of the second electrode is fixed in the fixation groove.

3. The humidity sensor according to claim 2, wherein the first support layer comprises a first support part and a first cantilever part connected with each other, the first support part is arranged on the base substrate and is located on at least one side of the first electrode, and the first cantilever part is intersected with the first support part and is located on the side of the first electrode away from the base substrate; the second support layer comprises a second support part and a second cantilever part connected with each other, the second support part is arranged on the base substrate and is located on a side of the first support part away from the first electrode, and the second cantilever part is intersected with the second support part and is arranged on a side of the first cantilever part away from the base substrate; and the fixation groove is formed between the second cantilever part and the first cantilever part.

4. The humidity sensor according to claim 3, wherein on a cross section perpendicular to a plane where the base substrate is located, the first support layer is in a shape of an inverted L, the first support part extends along a thickness direction of the base substrate, and the first cantilever part extends along a direction parallel to the plane where the base substrate is located; or on a cross section perpendicular to a plane where the base substrate is located, the second support layer is in a shape of an inverted L, the second support part extends along a thickness direction of the base substrate, and the second cantilever part extends along a direction parallel to the plane where the base substrate is located; or at least a portion of the first support part is in contact with the second support part; or a portion of the first cantilever part close to the first support part is in contact with a portion of the second cantilever part close to the second support part, and the fixation groove is formed between a portion of the first cantilever part away from the first support part and a portion of the second cantilever part away from the second support part; or the fixation groove is formed between the whole first cantilever part and the whole second cantilever part, and an orthographic projection of the fixation groove on the base substrate coincides with orthographic projections of the first cantilever part and the first support part on the base substrate.

5. The humidity sensor according to claim 4, wherein an orthographic projection of the fixation groove on the base substrate is overlapped with the orthographic projection of the first electrode on the base substrate; or an orthographic projection of the fixation groove on the base substrate is completely overlapped with an orthographic projection of at least one end of the second electrode on the base substrate.

6. The humidity sensor according to claim 4, wherein an orthographic projection of at least a portion of the fixation groove on the base substrate is overlapped with an orthographic projection of an end of the second electrode on the base substrate, and an orthographic projection of at least a portion of the fixation groove is not overlapped with the orthographic projection of the second electrode on the base substrate.

7. The humidity sensor according to claim 5, wherein the orthographic projection of the first electrode on the base substrate is within the orthographic projection of the second electrode on the base substrate.

8. The humidity sensor according to claim 2, wherein each of the first support layer and the second support layer comprises a hard metal material.

9. The humidity sensor according to claim 2, wherein the first support layer and the second support layer are both layered structures, the first support layer is arranged on the base substrate and is arranged on at least one side of the first electrode, the second support layer is arranged on the first support layer, and the fixation groove is formed between an end of the second support layer close to the first electrode and an end of the first support layer close to the first electrode.

10. The humidity sensor according to claim 9, wherein an orthographic projection of the first support layer on the base substrate is not overlapped with an orthographic projection of the first electrode on the base substrate; or an orthographic projection of the second support layer on the base substrate is within an orthographic projection of the first support layer on the base substrate and is not overlapped with the orthographic projection of the first electrode on the base substrate; or the first support layer comprises an optical adhesive; or the second support layer comprises an inorganic material; or a side surface of the first support layer is in contact with a side surface of the first electrode.

11. The humidity sensor according to claim 1, wherein the support structure comprises a support layer with a single layer, a fixation groove is provided on a side of the support layer with the single layer close to the second electrode, and at least one end of the second electrode is fixed in the fixation groove.

12. The humidity sensor according to claim 1, further comprising a dielectric layer, and the dielectric layer is arranged on the first electrode and at least covers a top surface of the first electrode.

13. The humidity sensor according to claim 1, further comprising a stress layer, at least a portion of the stress layer is arranged between the first electrode and the base substrate.

14. The humidity sensor according to claim 1, wherein support structures are located on two opposite sides of the first electrode.

15. The humidity sensor according to claim 1, wherein the support structure is located on a side of the first electrode.

16. The humidity sensor according to claim 15, further comprising an anti-adhesion post, which is arranged on the base substrate; the anti-adhesion post and the support structure are located on different sides of the first electrode; an orthographic projection of the anti-adhesion post on the base substrate is overlapped with an orthographic projection of at least a portion of the second electrode on the base substrate, and the orthographic projection of the anti-adhesion post on the base substrate is not overlapped with the orthographic projection of the first electrode on the base substrate; and a top surface of the anti-adhesion post is located on a side of the top surface of the first electrode away from the base substrate.

17. The humidity sensor according to claim 1, wherein an orthographic projection of the adsorption layer on the base substrate is within the orthographic projection of the second electrode on the base substrate; or an orthographic projection of the adsorption layer on the base substrate is overlapped with the orthographic projection of the first electrode on the base substrate.

18. The humidity sensor according to claim 1, further comprising digital controlled circuit, which is connected to at least one sensor unit and is configured to transmit a drive signal to particular one or more sensor units.

19. An electronic device, comprising the humidity sensor according to claim 1.

20. A method for manufacturing a humidity sensor, comprising:

forming a first electrode on a base substrate;

forming a support structure on the base substrate, the support structure being located on at least one side of the first electrode;

forming a second electrode, which is located on a side of the first electrode away from the base substrate, wherein an orthographic projection of the second electrode on the base substrate is overlapped with an orthographic projection of the first electrode on the base substrate, and a space is provided between the second electrode and the first electrode; at least one end of the second electrode is fixed to the support structure; and forming an adsorption layer on the second electrode.

* * * * *